US011291036B2

(12) United States Patent
Liu et al.

(10) Patent No.: US 11,291,036 B2
(45) Date of Patent: Mar. 29, 2022

(54) SCHEDULING REQUESTS AND BUFFER STATUS REPORTS FOR LOW LATENCY WIRELESS COMMUNICATIONS

(71) Applicant: QUALCOMM Incorporated, San Diego, CA (US)

(72) Inventors: Feilu Liu, San Diego, CA (US); Arnaud Meylan, San Diego, CA (US); Amir Farajidana, Sunnyvale, CA (US); Ozcan Ozturk, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/933,129

(22) Filed: Mar. 22, 2018

(65) Prior Publication Data
US 2018/0279359 A1  Sep. 27, 2018

Related U.S. Application Data

(60) Provisional application No. 62/476,389, filed on Mar. 24, 2017.

(51) Int. Cl.
*H04W 72/14* (2009.01)
*H04W 72/04* (2009.01)
(Continued)

(52) U.S. Cl.
CPC ....... *H04W 72/14* (2013.01); *H04W 28/0278* (2013.01); *H04W 72/0413* (2013.01); *H04W 72/1268* (2013.01); *H04W 72/1284* (2013.01)

(58) Field of Classification Search
CPC ......... H04W 72/0413; H04W 72/1284; H04W 28/0278; H04W 72/1268; H04W 72/14; H04W 72/1263
(Continued)

(56) References Cited

U.S. PATENT DOCUMENTS 10,542,503 B2   1/2020  Nory et al.
10,743,340 B2   8/2020  Dudda et al.
(Continued)

FOREIGN PATENT DOCUMENTS

JP    2010530707 A    9/2010
JP    2014195265 A    10/2014
(Continued)

OTHER PUBLICATIONS

Asustek: "Discussion on SR and BSR in NR", 3GPP Draft; R2-1701448 Discussion on SR and BSR in NR, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17, 2017, Feb. 12, 2017, XP051212086, 4 pages, Retrieved from the Internet: URL: http://www.3gpp.org/ftp/Meetings_3GPP_SYNC/RAN2/Docs/ [retrieved on Feb. 12, 2017].
(Continued)

*Primary Examiner* — Rownak Islam
(74) *Attorney, Agent, or Firm* — Terry Tsai

(57) ABSTRACT

A base station may transmit a grant to user equipment (UEs), indicating uplink resources for transmission of pending data at a UE. Uplink resources may include uplink resources associated with transmission time intervals (TTIs) and/or shortened TTIs (sTTIs). A UE may identify pending data associated with a data type (e.g., low latency data, internet traffic, etc.) and transmit a scheduling request (SR) for a grant of uplink resources. The data type of the pending data (e.g., the logic channel group identification (LCG ID) associated with a buffer status) may be indicated such that uplink resources may be granted to the UE to reduce latency. In some aspects, the SR may indicate uplink resources associated with sTTIs. Further, the UE may prioritize pending data
(Continued)

and buffer status reports (BSRs) associated with other data within the received grant.

17 Claims, 15 Drawing Sheets

(51) Int. Cl.
*H04W 28/02* (2009.01)
*H04W 72/12* (2009.01)

(58) Field of Classification Search
USPC .................................................. 370/330, 329
See application file for complete search history.

(56) References Cited

U.S. PATENT DOCUMENTS

| | | | | |
|---|---|---|---|---|
| 2008/0117891 | A1* | 5/2008 | Damnjanovic | H04W 72/04 370/345 |
| 2010/0255850 | A1* | 10/2010 | Kaukoranta | H04W 72/1268 455/450 |
| 2012/0044878 | A1* | 2/2012 | Ratasuk | H04W 74/0866 370/329 |
| 2013/0182623 | A1* | 7/2013 | Fan | H04W 4/70 370/311 |
| 2014/0126399 | A1* | 5/2014 | Damnjanovic | H04W 24/10 370/252 |
| 2015/0117342 | A1* | 4/2015 | Loehr | H04W 72/1284 370/329 |
| 2015/0223097 | A1* | 8/2015 | Hsu | H04W 72/1221 370/329 |
| 2017/0019882 | A1* | 1/2017 | Nimbalker | H04W 74/02 |
| 2017/0155477 | A1* | 6/2017 | Kyo | H04W 72/1284 |
| 2017/0164363 | A1* | 6/2017 | Zhang | H04L 1/00 |
| 2017/0202009 | A1* | 7/2017 | Kim | H04W 72/1284 |
| 2017/0332392 | A1* | 11/2017 | Miao | H04W 72/12 |
| 2018/0132268 | A1* | 5/2018 | Zhang | H04L 1/18 |
| 2018/0139030 | A1* | 5/2018 | Kim | H04L 5/0042 |
| 2018/0302900 | A1 | 10/2018 | Ibars Casas et al. | |
| 2018/0343667 | A1* | 11/2018 | Li | H04L 5/0037 |
| 2019/0215856 | A9* | 7/2019 | Nory | H04W 72/1284 |
| 2019/0223048 | A1* | 7/2019 | Xu | H04W 72/10 |
| 2019/0297523 | A1* | 9/2019 | Basu Mallick | H04W 16/32 |
| 2019/0306872 | A1* | 10/2019 | Paredes Cabrera | H04L 5/0082 |
| 2019/0335448 | A1* | 10/2019 | Yang | H04W 72/1278 |
| 2019/0349923 | A1* | 11/2019 | Shao | H04L 5/00 |
| 2020/0037345 | A1* | 1/2020 | Ryoo | H04W 76/27 |
| 2020/0196185 | A1* | 6/2020 | Babaei | H04W 72/1284 |

FOREIGN PATENT DOCUMENTS

| | | | | |
|---|---|---|---|---|
| KR | 20190100243 A | * | 8/2019 | ........ H04W 72/1278 |
| TW | 201613399 A | | 4/2016 | |
| WO | 2016029736 A1 | | 3/2016 | |

OTHER PUBLICATIONS

Ericsson: "Logical Channel Prioritization with short TTI," 3GPP Draft; R2-1701609—LCP and STTI, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17, 2017, Feb. 12, 2017, XP051212203, 3 Pages, Retrieved from the Internet: URL: http://www.3gpp.org/ftp/Meetings_3GPP_SYNC/RAN2/Docs/ [retrieved on Feb. 12, 2017].

Huawei, et al., "UL Scheduling Enhancement in NR", 3GPP Draft; R2-1701207, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017, XP051211896, 3 Pages, Retrieved from the Internet: URL: http://www.3gpp.org/ftp/Meetings_3GPP_SYNC/RAN2/Docs/ [retrieved on Feb. 12, 2017].

Intel Corporation: "Uplink URLLC Transmission Based on Scheduling Request and Grant," 3GPP Draft; R1-1700376 Intel—UL SR URLLC, 3rd Generation Partnership Project (3GPP), Mobile Competence Centre; 650, Route Des Lucioles; F-06921, Sophia-Antipolis Cedex; France, vol. RAN WG1, No. Spokane, USA, Jan. 16, 2017-Jan. 20, 2017, Jan. 16, 2017, XP051207913, 8 pages, Retrieved from the Internet: URL: http://www.3gpp.org/ftp/Meetings_3GPP_SYNC/RAN1/Docs/ [retrieved on Jan. 16, 2017].

International Search Report and Written Opinion—PCT/US2018/024076—ISA/EPO—dated Jul. 11, 2018.

Samsung: "UL Scheduling Issues for Latency Reduction in NR," 3GPP Draft; R2-1701993—UL Scheduling Issues for Latency Reduction in NR, 3rd Generation Partnership Project (3GPP), Mobile Competence Centre; 650, Route Des Lucioles; F-06921, Sophia-Antipolis Cedex; vol. RAN WG2, No. Athens, Greece; Feb. 13, 2017-Feb. 17, 2017, Feb. 12, 2017, XP051212508, 4 pages, Retrieved from the Internet: URL: http://www.3gpp.org/ftp/Meetings_3GPP_SYNC/RAN2/Docs/ [retrieved on Feb. 12, 2017].

3GPP TS 36.321, "3rd Generation Partnership Project, Technical Specification Group Radio Access Network, Evolved Universal Terrestrial Radio Access (E-UTRA), Medium Access Control (MAC) Protocol Specification (Release 14)", 3GPP TS 36.321, V14.2.0, Mar. 2017, pp. 1-106.

Panasonic: "Priority Handling of MAC Control Elements", R2-086324 (R2-085106), 3GPP TSG RAN WG2#64, Prague, Czech Republik, Nov. 10-Nov. 14, 2008, pp. 1-2.

Taiwan Search Report—TW107109990—TIPO—dated Jun. 30, 2021.

Huawei, et al., "Discussion on SR for Shortened TTI", 3GPP Draft, 3GPP TSG RAN WG1 Meeting #88, R1-1703070, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051210208, 4 Pages, , Retrieved from the Internet: URL: http://www.3gpp.org/ftp/Meetings_3GPP_SYNC/RAN1/Docs/ [retrieved on Feb. 12, 2017].

Qualcomm Incorporated: "SR and BSR for Short TTI", 3GPP Draft, 3GPP TSG-RAN2 Meeting #97bis, R2-1703693, Spokane, USA, Apr. 3-7, 2017, 2 Pages.

Samsung: "Numerology and Frame Structure for 5G New Radio Interface: Sub-6GHz", 3GPP Draft, 3GPP TSG RAN NG1 #84bis, R1-162179, Busan, Korea, Apr. 11-15, 2016, 5 Pages.

* cited by examiner

SCHEDULING REQUESTS AND BUFFER STATUS REPORTS FOR LOW LATENCY WIRELESS COMMUNICATIONS

CROSS REFERENCES

The present Application for Patent claims priority to U.S. Provisional Patent Application No. 62/476,389 by Liu, et al., entitled "Scheduling Requests and Buffer Status Reports For Low Latency Wireless Communications," filed Mar. 24, 2017, assigned to the assignee hereof.

BACKGROUND

The following relates generally to wireless communications and, more specifically, to scheduling requests (SRs) and buffer status reports (BSRs) for low latency wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station in some wireless communications systems (e.g., LTE or NR deployments) may transmit to a UEs using different length transmission time intervals (TTIs) that may be vary in length relative to TTIs in other communications systems. For example, a TTI in an NR system may have a shorter duration than a TTI in an LTE system. Such a shorter duration TTI may be referred to as a shortened TTI (sTTI) and may be utilized by UEs (or other devices) to support low latency communications. An sTTI may be a subset of one or more subframes that correspond to subframes of a TTI. A base station may allocate transmission resources for sTTIs to a UE that may include time resources (e.g., subframes), frequency resources (e.g., sub-carriers), and one or more component carriers (CCs) to be used for sTTI transmissions.

In some wireless communications systems, a UE may indicate to a base station that it has uplink data to transmit by sending a BSR. However, if sufficient uplink resources are not available to transmit the BSR (at least at a given time), the UE may transmit a SR requesting a grant of resources to transmit the BSR. In some aspects (e.g., low latency applications), such signaling may result in unnecessary overhead, and reduced system performance.

SUMMARY

The described techniques relate to improved methods, systems, devices, or apparatuses that support scheduling requests (SRs) and buffer status reports (BSRs) for low latency wireless communications. A base station may transmit a grant to a user equipment (UE), indicating uplink resources for transmission of pending data at a UE. Uplink resources may include uplink resources associated with transmission time intervals (TTIs) and/or shortened TTIs (sTTIs). A UE may identify pending data associated with a data type (e.g., low latency data, internet traffic, voice communication, etc.) and transmit an SR for a grant of uplink resources. The data type of the pending data (e.g., the logic channel group identification (LCG ID) associated with a buffer status) may be indicated (e.g., to the base station) such that uplink resources may be granted to the UE to reduce latency (e.g., arising from buffer status report (BSR) round trip times). In some aspects, the SR may indicate uplink resources associated with sTTIs. Further, the UE may prioritize pending data and BSRs associated with other data within the received grant.

In some examples, an SR may include a signal containing an on/off information bit indicating whether a grant is needed for a BSR transmission. According to techniques described herein, the SR transmission on physical uplink control channel (PUCCH) resources (e.g., over a TTI having a 1 ms duration) may be modified to include an explicit indication of or a request for an sTTI. Alternatively, shortened PUCCH (sPUCCH) resources may be used for transmission of an SR and/or BSR (e.g., shortened SR (sSR) and or shortened BSR (sBSR)) to implicitly request one or more sTTIs for transmission of pending data. That is, transmission of sSRs and/or sBSRs may indicate the presence of low latency uplink traffic, and may further indicate a request for an sTTI grant for the uplink traffic (e.g., compared to a TTI grant). In such aspects, the base station may transmit a grant for shortened PUSCH (e.g., sPUSCH) utilizing one or more sTTIs and, in some aspects, predetermined sBSR thresholds (e.g., indicating a maximum amount of sTTI resources needed for pending data at a UE).

A method of for wireless communications is described. The method may include identifying data of a first data type and transmitting a scheduling request for a grant of resources associated with the first data type, wherein the resources associated with the first data type and resources associated with a second data type have TTIs of different durations. The method may further include receiving, in response to the scheduling request, an uplink grant indicating a set of resources associated with the first data type, and transmitting, using the set of resources indicated by the uplink grant, the identified data of the first data type, or the BSR, or both.

An apparatus for wireless communications is described. The apparatus may include means for identifying data of a first data type and means for transmitting a scheduling request for a grant of resources associated with the first data type, wherein the resources associated with the first data type and resources associated with a second data type have TTIs of different durations. The apparatus may further include means for receiving, in response to the scheduling request, an uplink grant indicating a set of resources associated with the first data type, and means for transmitting, using the set of resources indicated by the uplink grant, the identified data of the first data type, or the BSR, or both.

Another apparatus for wireless communications is described. The apparatus may include a processor, memory in electronic communication with the processor, and instructions stored in the memory. The instructions may be operable to cause the processor to identify data of a first data type and transmit a scheduling request for a grant of resources associated with the first data type, wherein the resources associated with the first data type and resources associated with a second data type have TTIs of different durations. The instructions may be operable to further cause the processor to receive, in response to the scheduling request, an uplink grant indicating a set of resources associated with the first data type, and transmit, using the set of resources indicated by the uplink grant, the identified data of the first data type, or the BSR, or both.

A non-transitory computer readable medium for wireless communications is described. The non-transitory computer-readable medium may include instructions operable to cause a processor to identify data of a first data type, and transmit a scheduling request for a grant of resources associated with the first data type, wherein the resources associated with the first data type and resources associated with a second data type have TTIs of different durations. The non-transitory computer-readable medium may include instructions operable to further cause a processor to receive, in response to the scheduling request, an uplink grant indicating a set of resources associated with the first data type, and transmit, using the set of resources indicated by the uplink grant, the identified data of the first data type, or the BSR, or both.

In some examples of the method, apparatus, and non-transitory computer-readable medium described above, transmitting the scheduling request comprises transmitting the scheduling request using a TTI associated with a control channel of the second data type. In some examples of the method, apparatus, and non-transitory computer-readable medium described above, the scheduling request indicates a sTTI associated with the first data type.

In some examples of the method, apparatus, and non-transitory computer-readable medium described above, the control channel comprises a PUCCH. In some examples of the method, apparatus, and non-transitory computer-readable medium described above, transmitting the scheduling request comprises transmitting the scheduling request using a control channel over a sTTI. In some examples of the method, apparatus, and non-transitory computer-readable medium described above, the control channel comprises a sPUCCH.

Some examples of the method, apparatus, and non-transitory computer-readable medium described above may further include processes, features, means, or instructions for determining a data size corresponding to the identified data of the first data type, wherein the scheduling request may be based at least in part on a comparison between the determined data size and a buffer threshold.

Some examples of the method, apparatus, and non-transitory computer-readable medium described above may further include processes, features, means, or instructions for receiving, from a base station, an indication of the buffer threshold configured by the base station. Some examples of the method, apparatus, and non-transitory computer-readable medium described above may further include processes, features, means, or instructions for determining a data size corresponding to the identified data of the first data type, wherein the scheduling request may be based at least in part on a comparison between the determined data size and an uplink grant size.

Some examples of the method, apparatus, and non-transitory computer-readable medium described above may further include processes, features, means, or instructions for transmitting, using the set of resources indicated by the uplink grant, a buffer status report based at least in part on an identification of additional data of the first data type or the second data type.

Some examples of the method, apparatus, and non-transitory computer-readable medium described above may further include processes, features, means, or instructions for transmitting, using the set of resources indicated by the uplink grant, additional data of the first data type or the second data type.

Some examples of the method, apparatus, and non-transitory computer-readable medium described above may further include processes, features, means, or instructions for prioritizing the identified data of the first data type and a buffer status report corresponding to additional data of the first data type or the second data type, wherein the identified data of the first data type and the additional data of the first data type or the second data type may be transmitted using the set of resource indicated by the uplink grant based at least in part on the prioritizing.

Some examples of the method, apparatus, and non-transitory computer-readable medium described above may further include processes, features, means, or instructions for receiving, from a base station, a radio bearer configuration indicating at least one radio bearer configured for communications of the first data type, the second data type, or both.

In some examples of the method, apparatus, and non-transitory computer-readable medium described above, the resources associated with the first data type comprises sPUSCH resources. In some examples of the method, apparatus, and non-transitory computer-readable medium described above, the resources associated with the first data type comprises sPUCCH resources. In some examples of the method, apparatus, and non-transitory computer-readable medium described above, the resources associated with the first data type and resources associated with the second data type are associated with different numerologies. In some examples of the method, apparatus, and non-transitory computer-readable medium described above, the first data type may be associated with low latency communications.

A method of for wireless communications is described. The method may include receiving, from a UE, a scheduling request for a grant of resources associated with a first data type, wherein the resources associated with the first data type and resources associated with a second data type have TTIs of different durations. The method may further include determining, in response to the scheduling request, a set of resources associated with the first data type, and transmitting, to the UE, an uplink grant that indicates the determined set of resources.

An apparatus for wireless communications is described. The apparatus may include means for receiving, from a UE, a scheduling request for a grant of resources associated with a first data type, wherein the resources associated with the first data type and resources associated with a second data type have TTIs of different durations. The apparatus may further include means for determining, in response to the scheduling request, a set of resources associated with the first data type, and means for transmitting, to the UE, an uplink grant that indicates the determined set of resources.

Another apparatus for wireless communications is described. The apparatus may include a processor, memory in electronic communication with the processor, and instructions stored in the memory. The instructions may be operable to cause the processor to receive, from a UE, a scheduling request for a grant of resources associated with a first data type, wherein the resources associated with the first data type and resources associated with a second data type have TTIs of different durations, determine, in response to the scheduling request, a set of resources associated with the first data type, and transmit, to the UE, an uplink grant that indicates the determined set of resources.

A non-transitory computer readable medium for wireless communications is described. The non-transitory computer-readable medium may include instructions operable to cause a processor to receive, from a UE, a scheduling request for a grant of resources associated with a first data type, wherein the resources associated with the first data type and resources associated with a second data type have TTIs of different durations, determine, in response to the scheduling request, a set of resources associated with the first data type, and transmit, to the UE, an uplink grant that indicates the determined set of resources.

Some examples of the method, apparatus, and non-transitory computer-readable medium described above may further include processes, features, means, or instructions for receiving, from the UE, data of the first data type via the determined set of resources. Some examples of the method, apparatus, and non-transitory computer-readable medium described above may further include processes, features, means, or instructions for receiving, via the determined set of resources, a buffer status report for additional data of the first data type or the second data type.

In some examples of the method, apparatus, and non-transitory computer-readable medium described above, receiving the scheduling request comprises: receiving the scheduling request via a TTI associated with a control channel of the second data type. In some examples of the method, apparatus, and non-transitory computer-readable medium described above, the scheduling request indicates a sTTI associated with the first data type.

In some examples of the method, apparatus, and non-transitory computer-readable medium described above, the control channel comprises a PUCCH. In some examples of the method, apparatus, and non-transitory computer-readable medium described above, receiving the scheduling request comprises: receiving the scheduling request via a control channel over a sTTI. In some examples of the method, apparatus, and non-transitory computer-readable medium described above, the control channel comprises a sPUCCH.

Some examples of the method, apparatus, and non-transitory computer-readable medium described above may further include processes, features, means, or instructions for determining an uplink grant size based at least in part on a buffer threshold that may be known to both the UE and base station, wherein the uplink grant indicates the uplink grant size. In some examples of the method, apparatus, and non-transitory computer-readable medium described above, the uplink grant size indicates number of bits contained in the uplink grant.

Some examples of the method, apparatus, and non-transitory computer-readable medium described above may further include processes, features, means, or instructions for transmitting, to the UE, an indication of a buffer threshold, wherein the scheduling request may be based at least in part on the buffer threshold.

Some examples of the method, apparatus, and non-transitory computer-readable medium described above may further include processes, features, means, or instructions for transmitting, to the UE, a radio bearer configuration indicating at least one radio bearer configured for communications of the first data type, the second data type, or both.

In some examples of the method, apparatus, and non-transitory computer-readable medium described above, the determined set of resources comprises sPUSCH resources. In some examples of the method, apparatus, and non-transitory computer-readable medium described above, the first data type may be associated with low latency communications.

DETAILED DESCRIPTION

Figure 1:
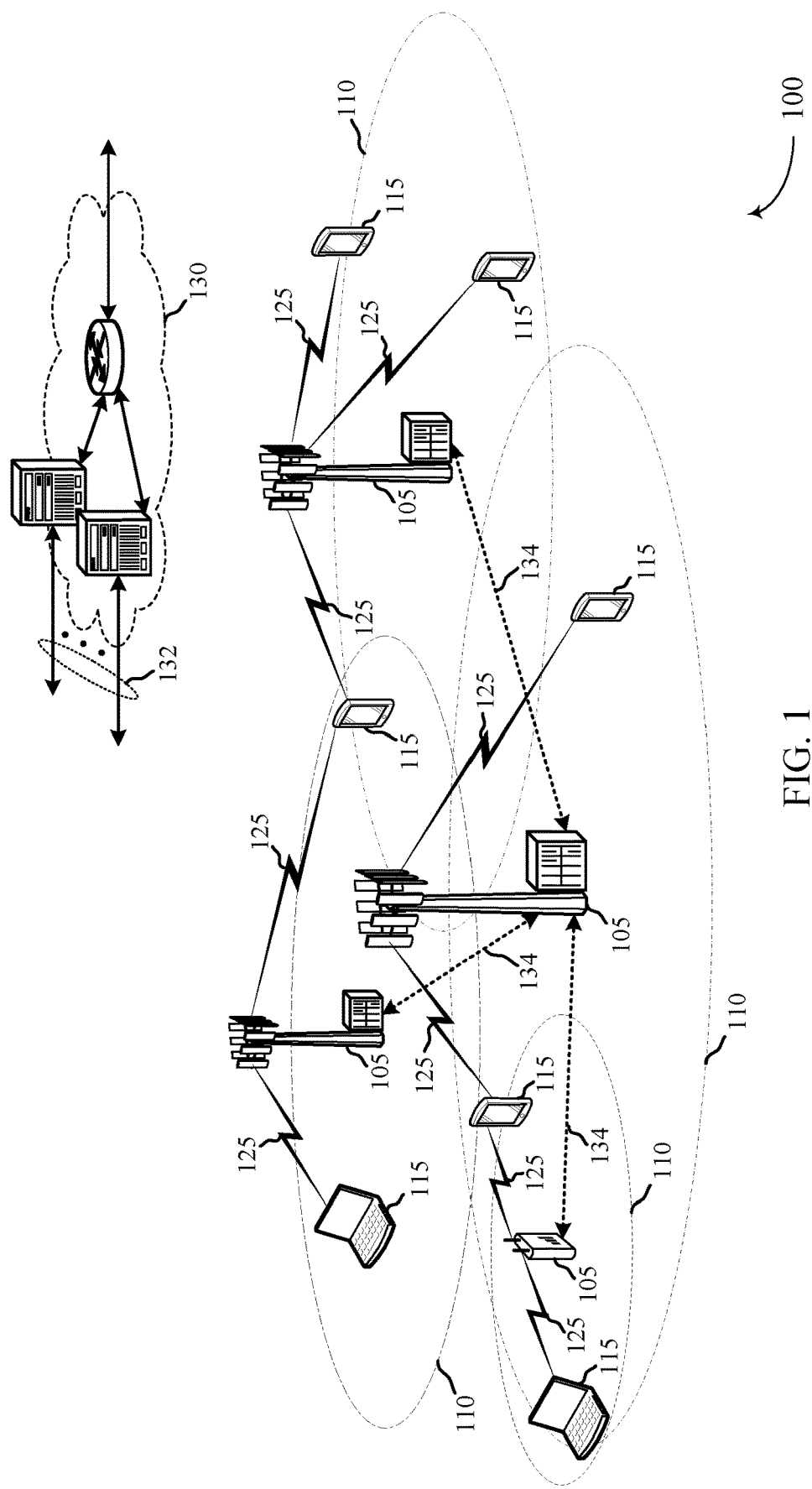
FIG. 1 illustrates an example of a system for wireless communications that supports scheduling requests and buffer status reports for low latency wireless communications in accordance with aspects of the present disclosure.

A base station may transmit a grant to a user equipment (UE) that indicates uplink resources for transmission of pending data at a UE. The uplink resources may include uplink resources associated with transmission time intervals (TTIs) and/or shortened TTIs (sTTIs). A UE may identify pending data associated with a data type (e.g., low latency data, internet traffic, etc.) and transmit a scheduling request (SR) for a grant of uplink resources. As further described below, the data type of the pending data (e.g., the logic channel group identification (LCG ID) associated with a buffer status) may be indicated such that uplink resources may be granted to the UE to reduce latency (e.g., arising from buffer status report (BSR) round trip times) for low latency communications.

Latencies associated with round trip times of BSR transmissions may be reduced via a shortened (sBSR) threshold. For example, an sBSR threshold may be configured as a predefined buffer size associated with a LCG ID. In some aspects, if a buffer size of the LCG ID buffer size is below a threshold (e.g., such that sTTIs are appropriate for transmission of the pending data), base station may size the grant according to the sBSR threshold. In such aspects, the sBSR threshold sized grant may ensure the grant is large enough to handle the pending data (e.g., the sBSR threshold may be analogous to a maximum grant size associated with sTTIs that may accommodate LCG ID buffer sizes small enough to benefit from sTTI usage). In this example, an sBSR may not be transmitted at all (e.g., the round trip time for BSR transmission may be eliminated, as an sBSR threshold sized grant may always be used when sTTIs are appropriate for pending data).

Alternatively, the usage of either a sBSR or a BSR may be used to indicate whether a sBSR threshold sized grant, or a grant of a size indicated by the BSR may be requested. In some aspects, a base station may configure (e.g., via control messages) a UE to allow some bearers, traffic flows, LCG IDs, etc. to trigger sBSRs. If the buffer size of an LCG ID is above a sBSR threshold (e.g., configured by the base station), a regular BSR transmission procedure may be used, as TTIs may be more efficient for large payloads. If the buffer size of the LCG ID is below the sBSR threshold, low latency sBSR may be used (e.g., BSR may be sent over sTTI, such as sPUSCH for example). In aspects where a sBSR threshold sized grant is used in response to an sBSR transmission, round trip times associated with BSR transmission may still be reduced due to the resulting grant being set as the size of the sBSR threshold.

In some examples, an SR may include a signal containing an on/off information bit indicating whether a grant is needed for a BSR transmission. According to techniques described herein, the SR may be transmitted using physical uplink control channel (PUCCH) resources (e.g., via a TTI having a 1 ms duration). The SR may be modified to include an explicit indication of or a request for an sTTI (e.g., using the on-off information bit). Alternatively, SR and/or BSR transmission may implicitly request one or more sTTIs for transmission of pending data. For instance, an SR or a BSR may be transmitted over one or more sTTIs (e.g., via shortened PUCCH (sPUCCH) resources) that may indicate the presence of low latency uplink traffic. Such an indication may be used to request a grant for sTTI resources for the uplink traffic (e.g., rather than a TTI grant). In such aspects, the base station may transmit a grant for shortened PUSCH (sPUSCH) according to sTTIs.

Aspects of the disclosure are initially described in the context of a wireless communications system. Example BSR formats and process flows supporting improved SRs and BSRs for low latency wireless communications are then described. Aspects of the disclosure are further illustrated by and described with reference to apparatus diagrams, system diagrams, and flowcharts that relate to scheduling requests and buffer status reports for low latency wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a long term evolution (LTE) (or LTE-Advanced (LTE-A)) network, or a New Radio (NR) network. In some aspects, wireless communications system 100 may support enhanced broadband communications, ultra-reliable (i.e., mission critical) communications, ultra-low latency (ULL) communications, etc. Transmissions between base stations 105 and UEs 115 may use sTTIs associated with low latency communications according to techniques as discussed herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some aspects, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some aspects, an MTC device may operate using half-duplex (one-way) communications at a reduced peak rate. MTC devices may also be configured to enter a power saving "deep sleep" mode when not engaging in active communications. In some aspects, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices may communicate, either directly or indirectly (e.g., through core network 130), with each other over backhaul links 134 (e.g., X1, X2, Xn etc.) that may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

In some aspects, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some aspects, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may support operation on multiple cells or carriers, a feature which may be referred to as CA or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Time intervals in LTE or NR may be expressed in multiples of a basic time unit (which may be a sampling period of Ts=1/30,720,000 seconds). Time resources in LTE/LTE-A may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some aspects the subframe may be the smallest scheduling unit, also known as a TTI. Other time units and resource configurations may be considered without departing from the scope of the disclosure.

In some aspects, wireless communications system 100 may utilize enhanced component carriers (eCCs). An eCC may be characterized by one or more features including: wider bandwidth, shorter symbol duration, and sTTIs. For example, an sTTI may be shorter than a subframe or may be dynamically selected (e.g., in sTTI bursts or in selected CCs using sTTIs). Selected CCs may, in some cases be associated with a different subcarrier spacing or a different numerology (e.g., type of physical resources determined based on at least the sTTI length and subcarrier spacing) than CCs associated with TTIs. In some aspects, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). In some aspects, an eCC may utilize a different symbol duration than other CCs, which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some aspects, the TTI duration (that is, the number of symbols in a TTI) may be variable. A 5G or NR carrier may be considered an eCC.

A UE 115 may trigger transmission of an SR to a base station 105 indicating the UE 115 has pending (e.g., buffered) traffic. In response to the SR, the base station 105 may send the UE 115 a grant for a BSR. A UE 115 may send transmissions to a base station 105, such as a BSR, to indicate an amount of pending data to be sent (e.g., a buffer size). The base station 105 may identify the size of pending data at UE 115, and may transmit a second grant to the UE 115 based on the pending data (e.g., buffer size). The UE 115 may then transmit pending data according to resources of the grant received in response to the BSR.

In some aspects, the SR may be in response to an event at the UE 115. For example, a change in BSR or uplink data arrival from a logical channel group (LCG) may trigger a SR. In some examples, the SR may include a physical (PHY) layer signal (e.g., containing an on/off information bit) contained in PUCCH (e.g., PUCCH formats 1/1a/1b). SRs may be configured to be sent periodically (e.g., every 1-80 ms) via radio resource control (RRC) signaling. In some aspects, the periodicity may be configured on a per-operator basis. Further, PUCCH resources (e.g., tones) for SRs may also be configured via RRC signaling.

A UE 115 may determine that it has uplink data to transmit, and transmit a BSR to a base station 105 (e.g., via a grant received in response to the transmitted SR) to obtain uplink resources for the uplink data (e.g., to obtain PUSCH for pending data). In some aspects, the UE 115 may utilize previously allocated PUSCH to transmit the BSR. However, there may not be enough resources available to transmit the BSR when a UE 115 has an opportunity to do so. As a result, the UE 115 may send a SR seeking an uplink grant (e.g., additional PUSCH for the BSR) from the base station 105 as discussed above. After receiving the BSR, a base station 105 may determine a size (e.g., in number of bits) of a second grant for the UE 115 based on the BSR. Upon receiving the second grant, the UE 115 may send data using the number of bits. In some aspects, if the UE 115 does not have enough data to fill the all the number of bits grant, the remainder may be filled via padding.

In some aspects, a BSR may refer to a one byte media access control (MAC) layer control element (CE) that indicates a LCG identification (ID) and a buffer size. A logic channel may refer to a traffic type (e.g., voice over LTE (VoLTE), internet, etc.). One or more logic channels may be grouped in to LCGs. For example, voice and internet traffic may be associated with different types of radio bearers. At the MAC layer, each bearer may be associated with a LCG ID. As such, UEs 115 may report buffer size separately for different traffic types via the MAC layer CE (e.g., the BSR). Each LCG ID associated with pending data may thus be indicated by separate bytes of information.

In some aspects, a transmitter, such as a UE 115, may identify one or more sTTIs for transmissions of some wireless communication services (e.g., an ULL service, an ultra-reliable low-latency communication (URLLC) service, etc.). A sTTI may be identified based on a duration of a TTI associated with the first wireless service being below a threshold duration (e.g., a TTI duration of less than 1 ms may be identified as a sTTI). As an example, a 1 ms TTI may be divided into six periods (e.g., sTTIs). In some aspects, TTIs and sTTIs may overlap in time.

According to techniques described herein, wireless communications system 100 may support SR and BSR transmission techniques utilizing sTTIs to reduce uplink data transmission latencies (e.g., associated with ULL communications).

SRs may be transmitted using an uplink control channel (e.g., a PUCCH). Alternatively, if control channel resources are not allocated to the UE 115 or the control channel is not configured for a scheduling request, a random access procedure may be used by the UE 115 (e.g., where a random sequence or preamble is transmitted to enable the base station to identify the UE). UEs 115 may use random access procedures to establish a connection and communicate with a network. For example, a UE 115 may determine that it has data to send and use random access procedures to initiate a data transfer with a base station 105. In some aspects, one or more UEs 115 may seek resources to send data and subsequently transmit a random access sequence or preamble to the base station. The base station 105 may detect the random access sequence transmissions from the one or more UEs 115 and assign resources for communication. Random access message transmissions may be based on the synchronization signal received from a base station 105. For example, the transmission of synchronization symbols from a base station may be used by a UE 115 to identify timing and/or frequency resources to send the random access message.

Figure 2:
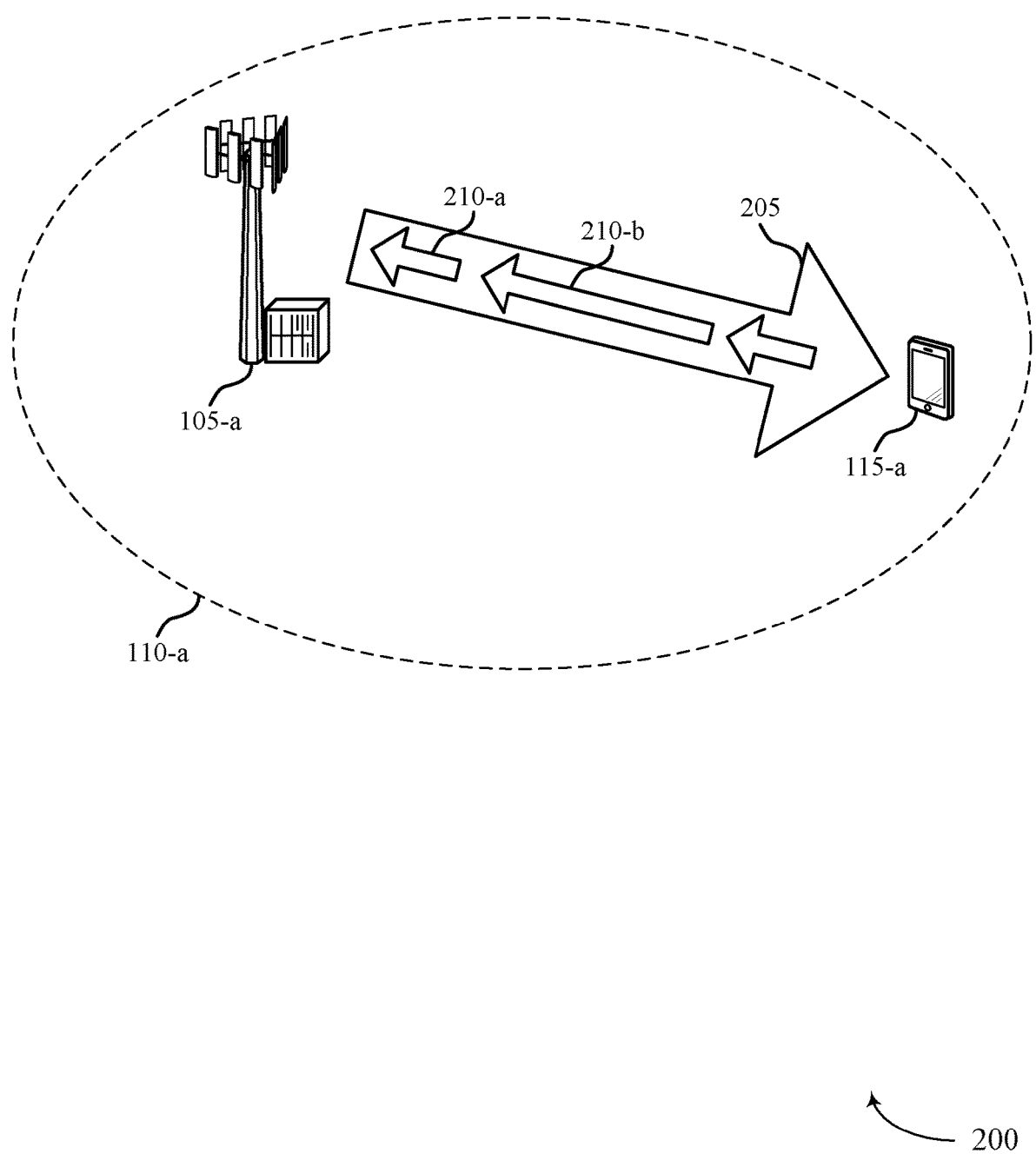
FIG. 2 illustrates an example of a wireless communications system that supports scheduling requests and buffer status reports for low latency wireless communications in accordance with aspects of the present disclosure.

FIG. 2 illustrates an example of a wireless communications system 200 that supports SRs and BSRs for low latency wireless communications in accordance with various aspects of the present disclosure. Wireless communications system 200 includes base station 105-a and UE 115-a, which may be examples of aspects of a UE 115 as described above with reference to FIG. 1. In the example of FIG. 2, the wireless communications system 200 may support operation utilizing sTTIs associated with low latency communications according to techniques as discussed herein, although such techniques may be applied to other communication types, TTI lengths, uplink channel types, etc.

According to some aspects, UE 115-a may identify pending data associated with a data type (e.g., low latency data, internet traffic, etc.) and transmit a SR for a grant 205 of uplink resources 210. In response, base station 105-a may transmit a grant 205 to UE 115-a, indicating uplink resources 210 for transmission of pending data at UE 115-a. As shown, uplink resources 210 may include sTTI resources 210-a and TTI resources 210-b. In some cases, sTTI resources 210-a and TTI resources 210-b may be associated with different time resources (e.g., subframe numerology, TTI or subframe length, etc.), frequency resources (e.g., such as subcarrier spacing, subcarrier numerology), or both. For example, TTI resources 210-b may be associated with a numerology defined by the TTI length and a first subcarrier spacing, while sTTI resources 210-a may be associated with a different numerology defined by the sTTI length and a second subcarrier spacing. The data type of the pending data (e.g., the LCG ID associated with a buffer status) may be indicated such that uplink resources 210-a associated with sTTIs and/or uplink resources 210-b associated with TTIs may be granted to UE 115-a to reduce latency (e.g., arising from BSR round trip times) for some communications (e.g., ULL communications).

In some aspects, an SR may include a PHY signal containing an on/off information bit indicating whether grant is needed for a BSR transmission. Further, UE 115-a may implicitly or explicitly request a sTTI for uplink transmissions (e.g., sTTI resources 210-a for pending ULL data). SR and/or BSR transmission on sTTI PUCCH resources (e.g., shortened SR (sSR) and or shortened BSR (sBSR)) may implicitly request one or more sTTIs for transmission of pending data. That is, transmission of sSRs and/or sBSRs may indicate the presence of low latency uplink traffic, and may further indicate a request for a sTTI grant for the uplink traffic (e.g., compared to a TTI grant). In some aspects, UE 115-a may explicitly request sTTIs by modifying the SR transmission (e.g., on 1 ms TTI PUCCH resources) to include an indication of or request for a sTTI. In the scenarios described above, base station 105-a may transmit a grant 205 (e.g., for sPUSCH, sPUCCH, etc.) according to sTTIs.

Latencies associated with round trip times of BSR transmissions may be reduced via a sBSR threshold. For example, a sBSR threshold may be configured as a predefined buffer size associated with a LCG ID. In some aspects, if the buffer size of the LCG ID is below a threshold (e.g., such that sTTIs are appropriate for transmission of the pending data), base station 105-a may size the grant according to the sBSR threshold. In such aspects, the sBSR threshold sized grant may ensure the grant is large enough to handle the pending data (e.g., the sBSR threshold may be analogous to a maximum grant size associated with sTTIs). In this example, a sBSR may not be transmitted at all (e.g., the round trip time for BSR transmission may be eliminated, as a sBSR threshold sized grant may always be used when sTTIs are appropriate for pending data).

Alternatively, the usage of either a sBSR or a BSR may be used to indicate whether a sBSR threshold sized grant, or a grant of a size indicated by the BSR may be requested. In some aspects, base station 105-a may configure (e.g., via control messages) the UE 115-a to allow some bearers, traffic flows, LCG IDs etc. to trigger sBSRs. If the buffer size of an LCG ID is above a sBSR threshold (e.g., configured by base station 105-a), a regular BSR transmission procedure may be used. If the buffer size of the LCG ID is below the sBSR threshold, low latency sBSR may be used (e.g., BSR may be sent over sTTI, using sPUSCH, for example). In aspects where a sBSR threshold sized grant is used in response to a sBSR transmission, round trip times associated with BSR transmission may still be reduced, as the resulting grant again may always be set as the size of the sBSR threshold.

For example, pending ULL traffic at UE 115-a may trigger an sSR. sSR may be transmitted on sPUCCH. Upon reception of sSR, base station 105-a may provide a sPUSCH grant. According to techniques described above, when base station 105-a receives an sSR, base station 105-a may determine UE 115-a may have pending data (e.g., buffer size) below a sBSR threshold. Therefore, base station 105-a may transmit a sBSR threshold sized grant to UE 115-a, which may eliminate the need for UE 115-a to transmit sBSR and/or BSR, hence reducing latency associated with sBSR/BSR round trip times.

Upon reception of a sPUSCH grant after transmission of a sSR, UE 115-a may prioritize usage of the grant based on the grant size in addition to the type and amount of pending data. If the grant is equal to or greater than the sBSR threshold, UE 115-*a* may prioritize data for the grant usage such that UE 115-*a* may not send sBSR or BSR unless the grant can accommodate all uplink data in addition to the sBSR or BSR. For example, if the grant can accommodate all the uplink traffic that is allowed to send on sPUSCH, UE 115-*a* may prioritize data for the grant usage and may not send sBSR or BSR unless the grant can accommodate all uplink data in addition to the sBSR or BSR. In some instances, UE 115-*a* may receive more ULL data after UE 115-*a* sends the sSR such that the total ULL data size exceeds the sBSR threshold. If the grant can accommodate all the uplink traffic that is allowed to send on sPUSCH, UE 115-*a* may prioritize sBSR or a BSR to use the grant, and UE 115-*a* may include as much ULL data as possible. If the grant is smaller than the sBSR threshold and cannot accommodate all the uplink traffic that is allowed to send on sPUSCH, UE 115-*a* may prioritize sBSR for the grant usage and include as much data as possible in the grant.

In some aspects, base station 105-*a* may configure UE 115-*a* to allow data from a bearer (e.g., LCG ID) to be transmitted on sTTIs only, TTIs only, or both sTTIs and TTIs. UE 115-*a* may trigger sSR for sTTI only bearers in aspects where base station 105-*a* configures UE 115-*a* for sTTI data transmissions. UE 115-*a* may trigger sSR for any bearers that can be transmitted on sTTI. That is, if a data radio bearer (DRB) is sTTI only, the bearer may be low latency. If DRB is both TTIs and sTTIs, low latency communications may be utilized. In aspects where base station 105-*a* configures UE 115-*a* for both sTTIs and TTIs or TTIs only, UE 115-*a* may trigger SR. UE 115-*a* and/or base station 105-*a* may send a message to base station 105-*a* to indicate which behavior described above UE 115-*a* will use, for one or more bearers.

UE 115-*a* may utilize multiple bearers and, in some aspects, a ULL bearer may trigger sSR for a sTTI grant and an internet (or other) bearer may trigger SR for a TTI grant. In such aspects, if sSR is triggered, any triggered SR may be canceled. Alternatively, if sSR is triggered, other triggered SR may not be canceled. If both sSR and SR are triggered, UE 115-*a* may only send sSR. When the grant (e.g., for sPUCCH resources, for sPUSCH resources, etc.) is received, the contents of the grant may be prioritized. If the grant can accommodate the BSR which contains the non-ULL bearer buffer size information (e.g., of internet data), UE 115-*a* may prioritize the BSR for the grant usage and as much additional data from the bearers that triggered the sSR may also be included. In other aspects, ULL data may be prioritized over non-ULL data. In such aspects, the BSR may be included in the grant only if space is available. In yet other aspects, if BSR can be included, UE 115-*a* may cancel the SR, or otherwise postpone the SR to the next opportunity.

In some examples, UE 115-*a* may transmit the sSR for ULL and the SR for non-ULL simultaneously during a subframe. If PUCCH is of a certain format (e.g., PUCCH format 1a/1b, etc.) sSR for ULL may take precedence over SR for non-ULL (e.g., which may be dropped). If PUCCH is of other formats (e.g., formats 3/4/5), UE 115-*a* may transmit both or only sSR for ULL.

Figure 3:
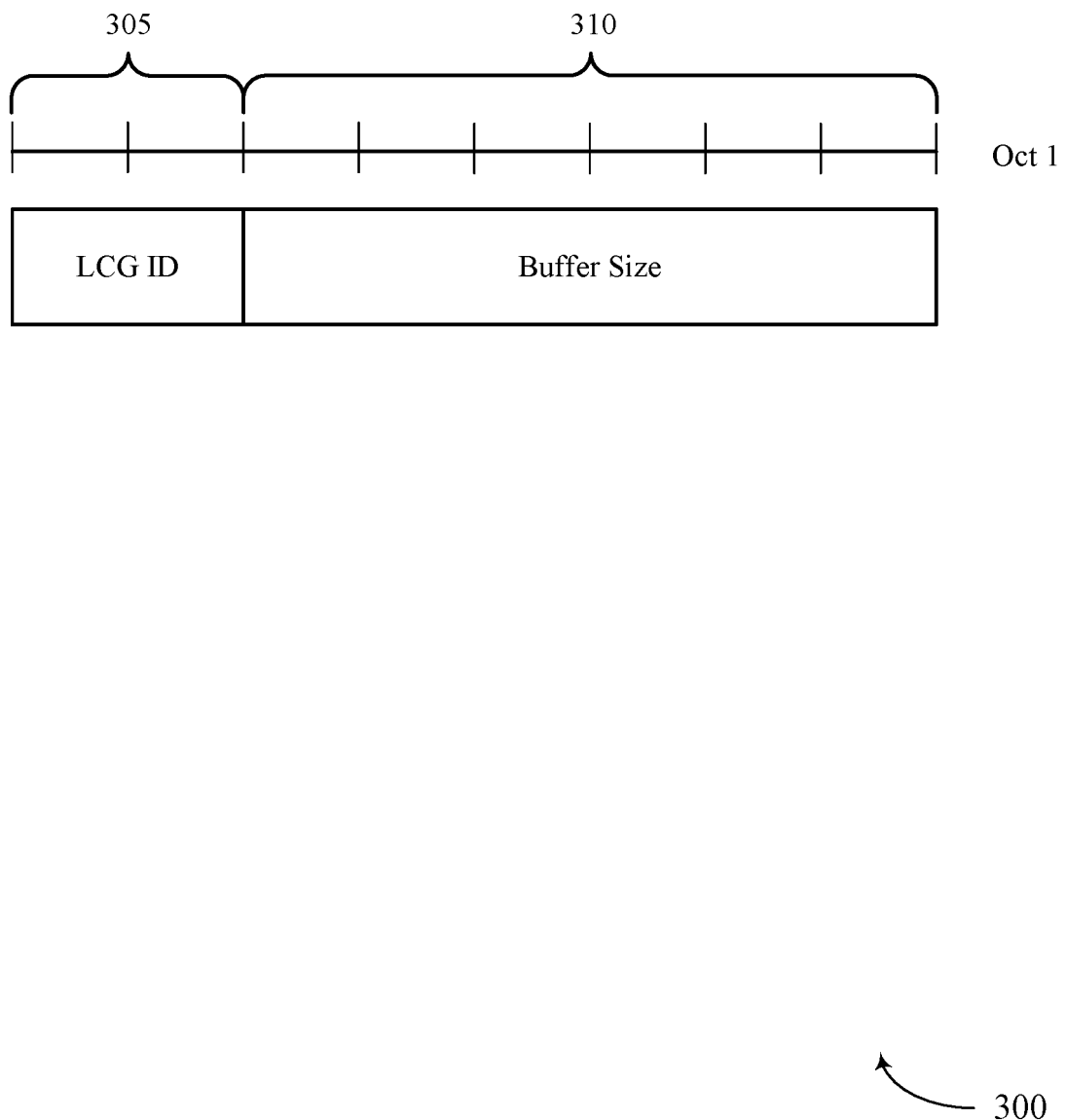
FIG. 3 illustrates an example of a buffer status report format that supports scheduling requests and buffer status reports for low latency wireless communications in accordance with aspects of the present disclosure.

FIG. 3 illustrates an example of a BSR format 300 that supports SRs and BSRs for low latency wireless communications in accordance with various aspects of the present disclosure. In some cases, BSR format may refer to an example of a 3GPP TS. 36.321 v13.4.0 LTE frame. Techniques described with reference to BSR format 300 may be utilized by UEs 115 as described above with reference to FIGS. 1 and 2. BSR format 300 may convey information about a buffer status (e.g., a LCG ID, buffer size). In the present example, the BSR format 300 may represent an octet of information (e.g., the LCG ID and buffer size may be conveyed using a byte or 8 bits of information). BSR format 300 may include a LCG ID field 305 and a buffer size field 310. The LCG ID field 305 may indicate one or more logic channels associated with a traffic type (e.g., VoLTE, internet, etc.). A UE 115 may report the buffer size separately (e.g., individually) for different traffic types. That is, a UE 115 may use multiple BSR formats (e.g., similar to BSR format 300) to convey information associated with different traffic types (e.g., ULL data or voice data). In such aspects, additional bytes may be used for each additional LCG ID or traffic type associated with the buffer.

Figure 4:
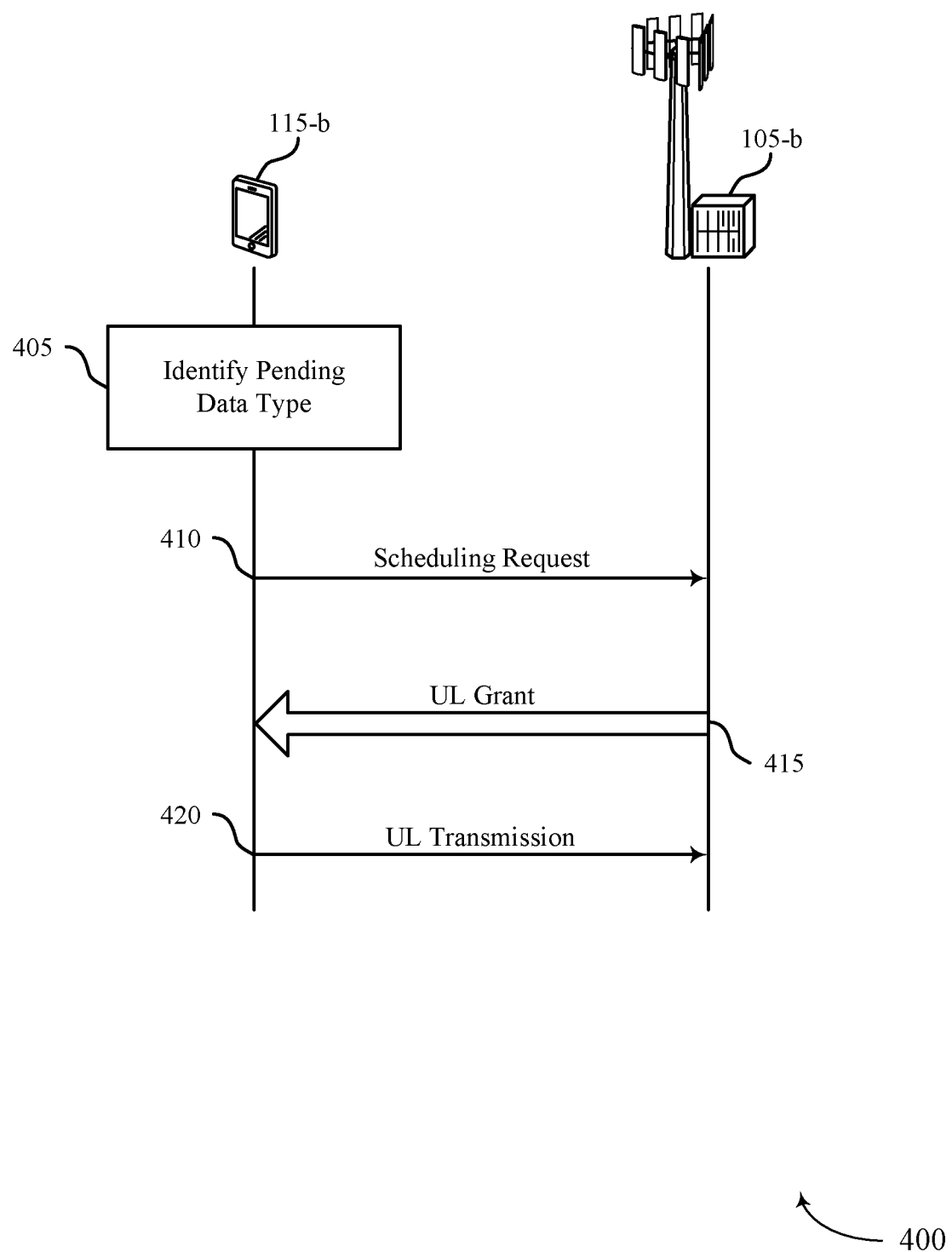
FIG. 4 illustrates an example of a process flow that supports scheduling requests and buffer status reports for low latency wireless communications in accordance with aspects of the present disclosure.

FIG. 4 illustrates an example of a process flow 400 that supports SRs and BSRs for low latency wireless communications in accordance with various aspects of the present disclosure. Process flow 400 includes base station 105-*b* and UE 115-*b*, which may be examples of aspects of a base station 105 or a UE 115 as described above with reference to FIGS. 1 and 2. At 405, UE 115-*b* may identify data of a data type (e.g., pending ULL data, etc.). In some aspects, UE 115-*b* may further determine a data size corresponding to the pending data (e.g., the size of a buffer).

At 410, UE 115-*b* may transmit an SR for a grant of resources associated with the data type. Resources associated with different data types may have TTIs of different durations, frequencies, etc. For example, an SR for a grant of resources associated with low latency data types may request sTTI resources, while an SR for a grant of resources associated with other data types (e.g., internet) may request TTI resources. In some aspects, the SR may be transmitted using a TTI associated with a control channel (e.g., PUCCH) and the SR may indicate a sTTI associated with the data type identified in 405 (e.g., via sPUCCH transmission). Further, the SR may be based on a comparison between a determined data size (e.g., of the pending data) and a buffer threshold, etc.

At 415, bases station 105-*b* may transmit an uplink grant indicating a set of resources (e.g., sPUCCH resources, sPUSCH resources for low latency data, etc.) to UE 115-*b* in response to the SR received at 410. In some aspects, base station 105-*b* may transmit an indication of a buffer threshold (e.g., that is configured by base station 105-*b*). In some aspects, UE 115-*b* may receive a radio bearer configuration indicating at least one radio bearer configured for communications of a first data type (e.g., low latency data), a second data type (e.g., internet traffic), or both.

In some aspects, UE 115-*b* may transmit, using the set of resources indicated by the uplink grant, a BSR based on an identification of additional data of the data type identified at 405 (e.g., low latency data) or identification of additional data of a different data type.

At 420, UE 115-*b* may transmit the data (e.g., of the identified data type determined at 405) to base station 105-*b*. The data may be transmitted using the set of resources indicated by the uplink grant received at 415. In aspects where additional data is identified following 415, the additional data may be transmitted using the set of resources indicated by the uplink grant. In such aspects, the identified data of 405 and a BSR corresponding to the additional data may be prioritized. The identified data of 405 and the additional data may be transmitted using the resources indicated by the uplink grant according to the prioritization.

Figure 5:
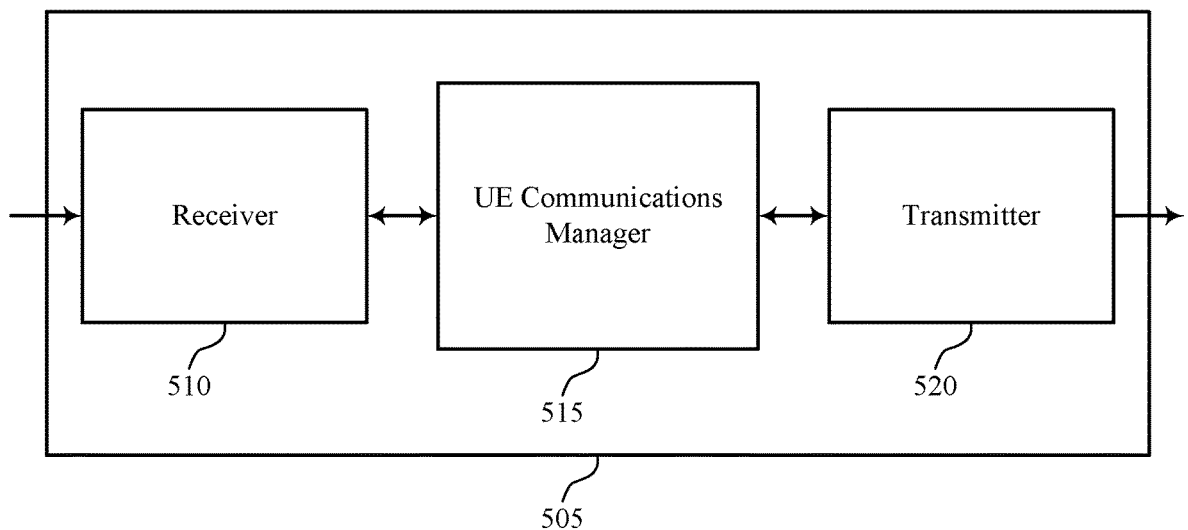
FIGS. 5 through 7 show block diagrams of a device that supports scheduling requests and buffer status reports for low latency wireless communications in accordance with aspects of the present disclosure.

FIG. 5 shows a block diagram 500 of a wireless device 505 that supports SRs and BSRs for low latency wireless communications in accordance with aspects of the present disclosure. Wireless device 505 may be an example of aspects of a UE 115 as described with reference to FIG. 1. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to SRs and BSRs for low latency wireless communications, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify data of a first data type, transmit a scheduling request for a grant of resources associated with the first data type, where the resources associated with the first data type and resources associated with a second data type have TTIs of different durations, receive, in response to the scheduling request, an uplink grant indicating a set of resources associated with the first data type, and transmit, using the set of resources indicated by the uplink grant, the identified data of the first data type, or the BSR, or both.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
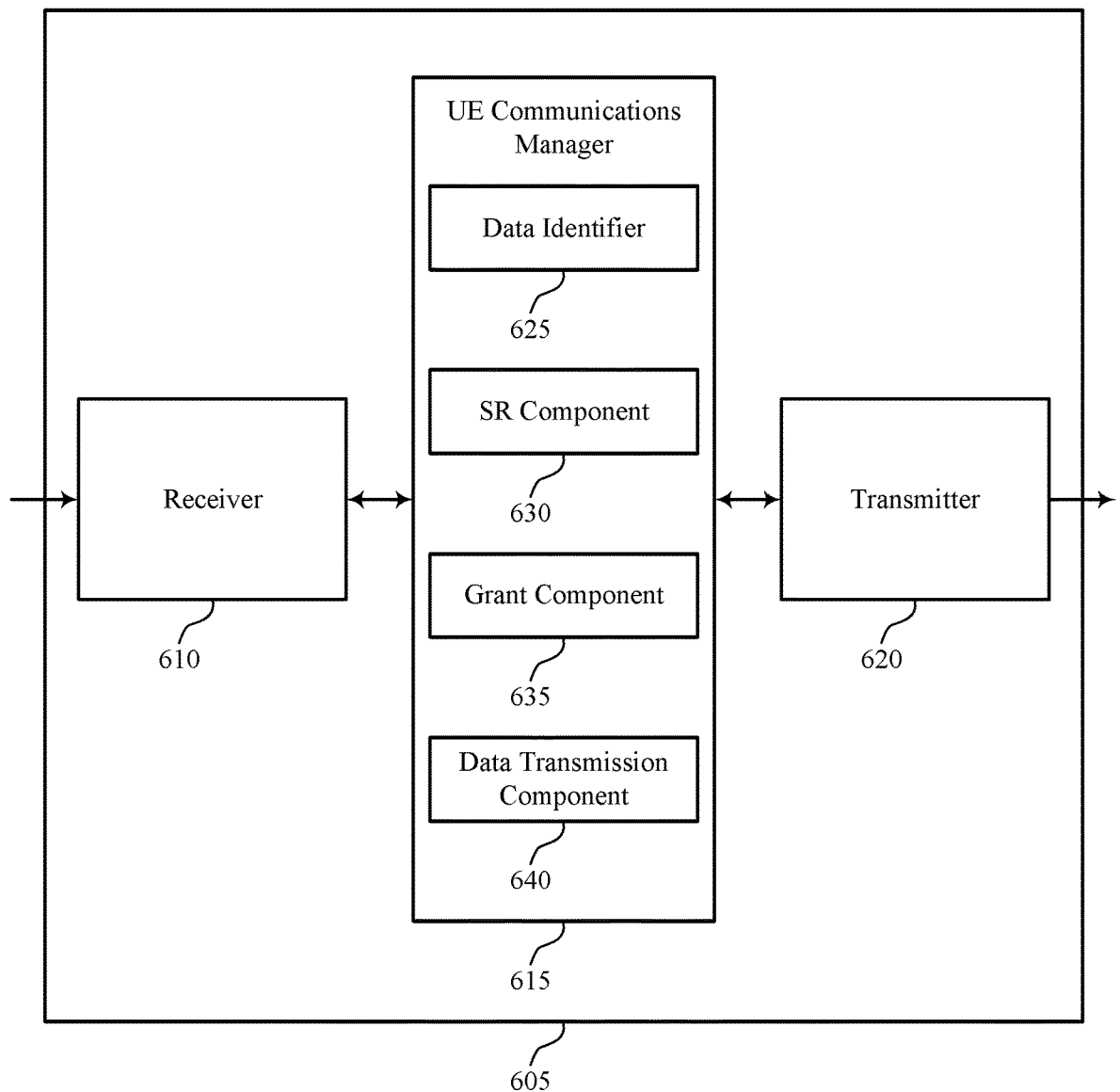

FIG. 6 shows a block diagram 600 of a wireless device 605 that supports SRs and BSRs for low latency wireless communications in accordance with aspects of the present disclosure. Wireless device 605 may be an example of aspects of a wireless device 505 or a UE 115 as described with reference to FIGS. 1 and 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to SRs and BSRs for low latency wireless communications, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include data identifier 625, SR component 630, grant component 635, and data transmission component 640. Data identifier 625 may identify data of a first data type. In some aspects, the first data type may be associated with low latency communications.

SR component 630 may transmit a scheduling request for a grant of resources associated with the first data type, where the resources associated with the first data type and resources associated with a second data type have TTIs of different durations. In some aspects, transmitting the scheduling request includes transmitting the scheduling request using a TTI associated with a control channel of the second data type. In some aspects, the scheduling request indicates a sTTI associated with the first data type. In some aspects, transmitting the scheduling request includes transmitting the scheduling request using a control channel over a sTTI. In some aspects, the control channel may be a PUCCH. Alternatively, the control channel may be a sPUCCH. In some aspects, the resources associated with the first data type includes sPUSCH resources.

Grant component 635 may receive, in response to the scheduling request, an uplink grant indicating a set of resources associated with the first data type.

Data transmission component 640 may transmit, using the set of resources indicated by the uplink grant, the identified data of the first data type, or the BSR, or both and transmit, using the set of resources indicated by the uplink grant, additional data of the first data type or the second data type.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
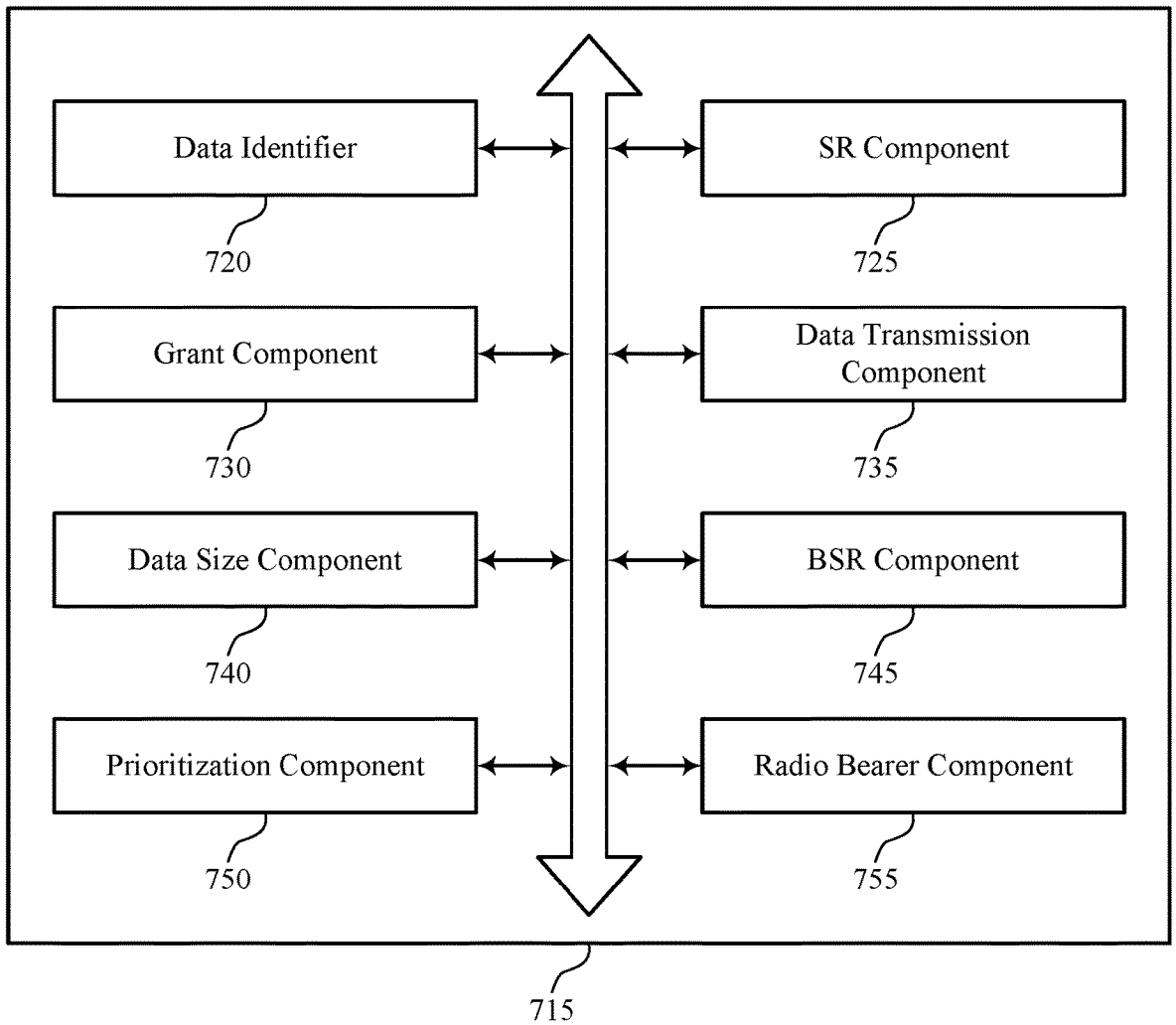

FIG. 7 shows a block diagram 700 of a UE communications manager 715 that supports SRs and BSRs for low latency wireless communications in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include data identifier 720, SR component 725, grant component 730, data transmission component 735, data size component 740, BSR component 745, prioritization component 750, and radio bearer component 755. Each of these modules may communicate, directly or indirectly, with one another (e.g., via one or more buses).

Data identifier 720 may identify data of a first data type. In some aspects, the first data type may be associated with low latency communications.

SR component 725 may transmit a scheduling request for a grant of resources associated with the first data type, where the resources associated with the first data type and resources associated with a second data type have TTIs of different durations. In some aspects, transmitting the scheduling request includes: transmitting the scheduling request using a TTI associated with a control channel of the second data type. In some aspects, the scheduling request indicates a sTTI associated with the first data type. In some aspects, the control channel may be a PUCCH. In some aspects, transmitting the scheduling request includes: transmitting the scheduling request using a control channel over an sTTI. In some aspects, the control channel may be a sPUCCH. In some aspects, the resources associated with the first data type includes sPUSCH resources.

Grant component 730 may receive, in response to the scheduling request, an uplink grant indicating a set of resources associated with the first data type.

Data transmission component 735 may transmit, using the set of resources indicated by the uplink grant, the identified data of the first data type, or the BSR, or both and transmit, using the set of resources indicated by the uplink grant, additional data of the first data type or the second data type.

Data size component 740 may determine a data size corresponding to the identified data of the first data type, where transmission of the identified data of the first data type, or the BSR, or both is based on a comparison between the determined data size and a buffer threshold. Data size component 740 may receive, from a base station, an indication of the buffer threshold configured by the base station, and determine a data size corresponding to the identified data of the first data type, where transmission of the identified data of the first data type, or the BSR, or both may be based on a comparison between the determined data size and an uplink grant size.

BSR component 745 may transmit, using the set of resources indicated by the uplink grant, a buffer status report based on an identification of additional data of the first data type or the second data type.

Prioritization component 750 may prioritize the identified data of the first data type and a buffer status report corresponding to additional data of the first data type or the second data type. In some aspects, the identified data of the first data type and the additional data of the first data type or the second data type may be transmitted using the set of resource indicated by the uplink grant based on the prioritizing.

Radio bearer component 755 may receive, from a base station, a radio bearer configuration indicating at least one radio bearer configured for communications of the first data type, the second data type, or both.

Figure 8:
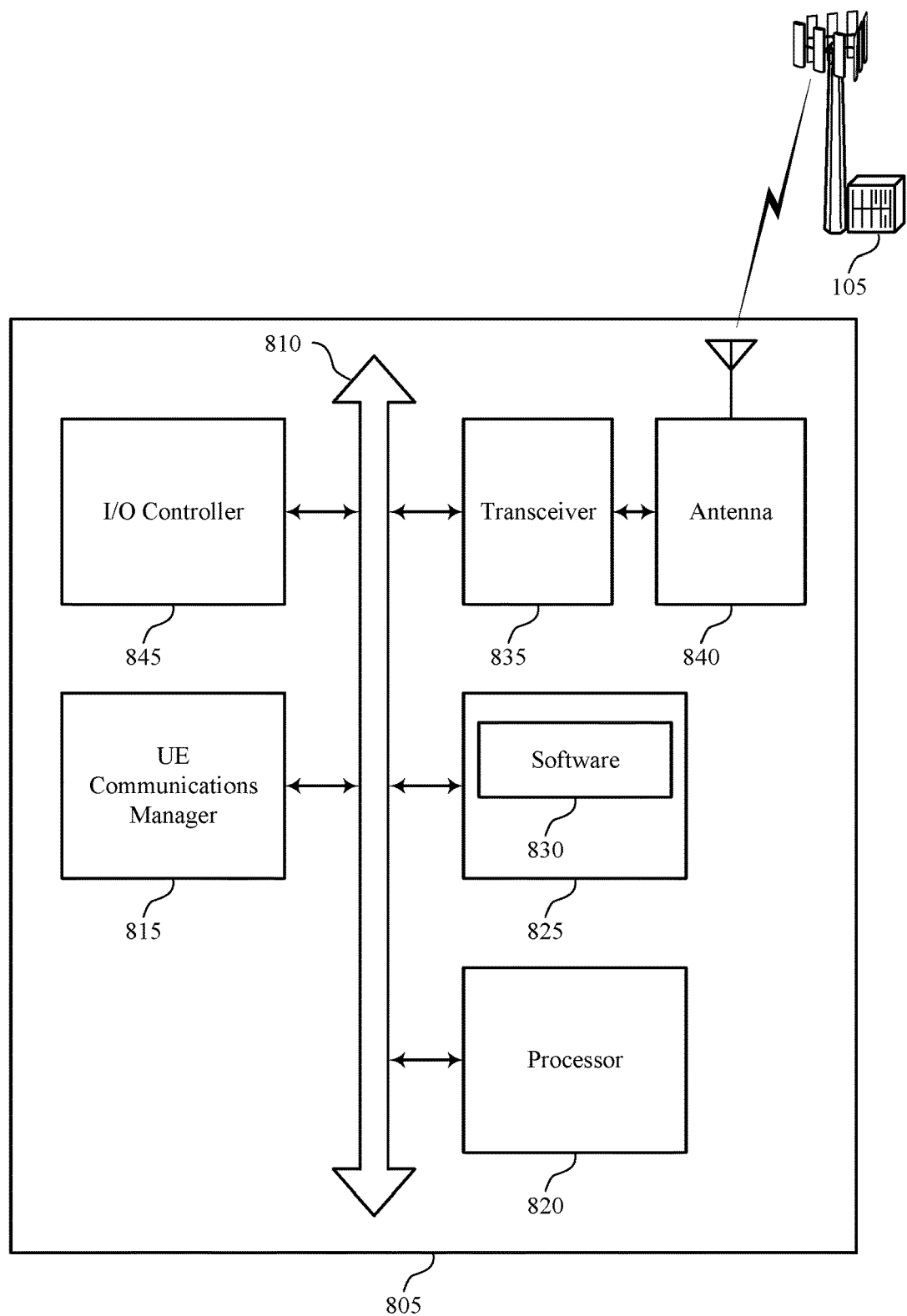
FIG. 8 illustrates a block diagram of a system including a user equipment (UE) that supports scheduling requests and buffer status reports for low latency wireless communications in accordance with aspects of the present disclosure.

FIG. 8 shows a diagram of a system 800 including a device 805 that supports SRs and BSRs for low latency wireless communications in accordance with aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 820 may be configured to operate a memory array using a memory controller. In other aspects, a memory controller may be integrated into processor 820. Processor 820 may be configured to execute computer-readable instructions stored in a memory to perform various functions (e.g., functions or tasks supporting SRs and BSRs for low latency wireless communications).

Memory 825 may include random access memory (RAM) and read only memory (ROM). The memory 825 may store computer-readable, computer-executable software 830 including instructions that, when executed, cause the processor to perform various functions described herein. In some aspects, the memory 825 may contain, among other things, a basic input/output system (BIOS) which may control basic hardware and/or software operation such as the interaction with peripheral components or devices.

Software 830 may include code to implement aspects of the present disclosure, including code to support SRs and BSRs for low latency wireless communications. Software 830 may be stored in a non-transitory computer-readable medium such as system memory or other memory. In some aspects, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some aspects, the wireless device may include a single antenna 840. However, in some aspects the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some aspects, I/O controller 845 may represent a physical connection or port to an external peripheral. In some aspects, I/O controller 845 may utilize an operating system such as iOS®, ANDROID®, MS-DOS®, MS-WINDOWS®, OS/2®, UNIX®, LINUX®, or another known operating system. In other aspects, I/O controller 845 may represent or interact with a modem, a keyboard, a mouse, a touchscreen, or a similar device. In some aspects, I/O controller 845 may be implemented as part of a processor. In some aspects, a user may interact with device 805 via I/O controller 845 or via hardware components controlled by I/O controller 845.

Figure 9:
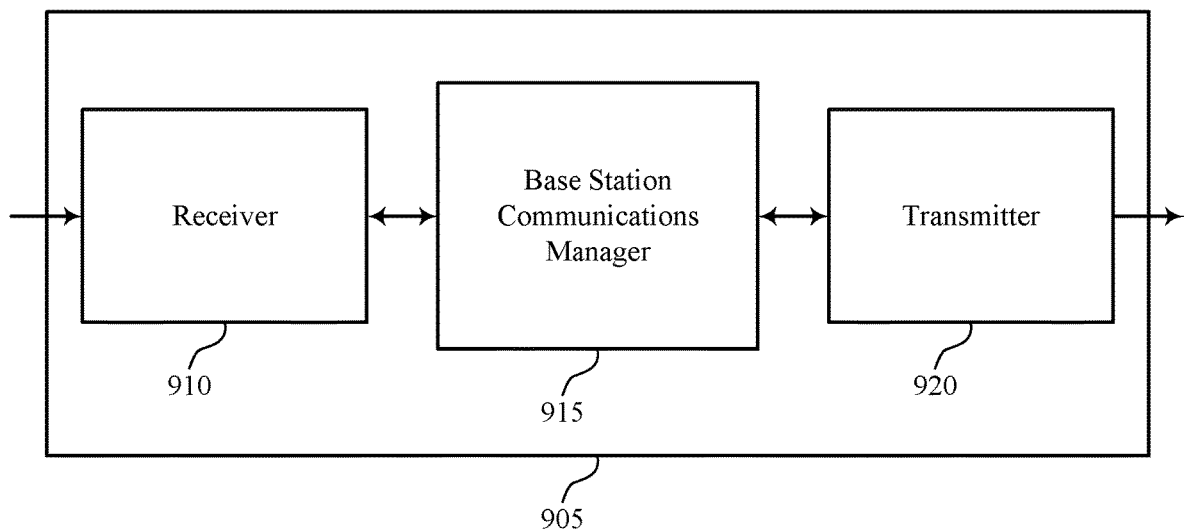
FIGS. 9 through 11 show block diagrams of a device that supports scheduling requests and buffer status reports for low latency wireless communications in accordance with aspects of the present disclosure.

FIG. 9 shows a block diagram 900 of a wireless device 905 that supports SRs and BSRs for low latency wireless communications in accordance with aspects of the present disclosure. Wireless device 905 may be an example of aspects of a base station 105 as described with reference to FIG. 1. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to SRs and BSRs for low latency wireless communications, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive, from a UE, a scheduling request for a grant of resources associated with a first data type, where the resources associated with the first data type and resources associated with a second data type have TTIs of different durations, determine, in response to the scheduling request, a set of resources associated with the first data type, and transmit, to the UE, an uplink grant that indicates the determined set of resources.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
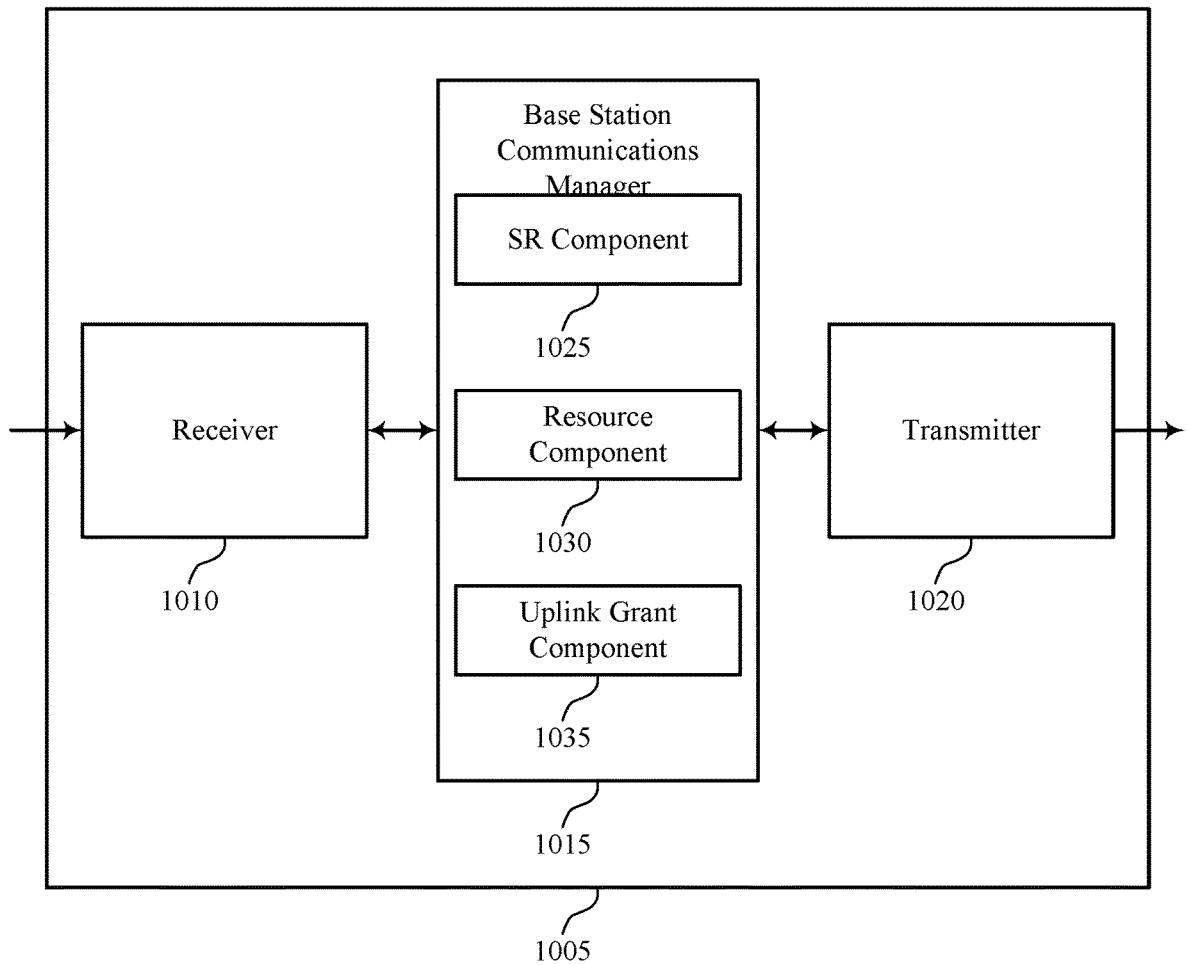

FIG. 10 shows a block diagram 1000 of a wireless device 1005 that supports SRs and BSRs for low latency wireless communications in accordance with aspects of the present disclosure. Wireless device 1005 may be an example of aspects of a wireless device 905 or a base station 105 as described with reference to FIGS. 1 and 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to SRs and BSRs for low latency wireless communications, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include SR component 1025, resource component 1030, and uplink grant component 1035.

SR component 1025 may receive, from a UE, a scheduling request for a grant of resources associated with a first data type, where the resources associated with the first data type and resources associated with a second data type have TTIs of different durations. In some aspects, receiving the scheduling request includes: receiving the scheduling request via a TTI associated with a control channel of the second data type. In some aspects, the scheduling request indicates a sTTI associated with the first data type. In some aspects, the control channel may be a PUCCH. In some aspects, receiving the scheduling request includes: receiving the scheduling request via a control channel over a sTTI. In some aspects, the control channel may be a sPUCCH. In some aspects, the first data type may be associated with low latency communications.

Resource component 1030 may determine, in response to the scheduling request, a set of resources associated with the first data type. In some aspects, the determined set of resources includes sPUSCH resources.

Uplink grant component 1035 may transmit, to the UE, an uplink grant that indicates the determined set of resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
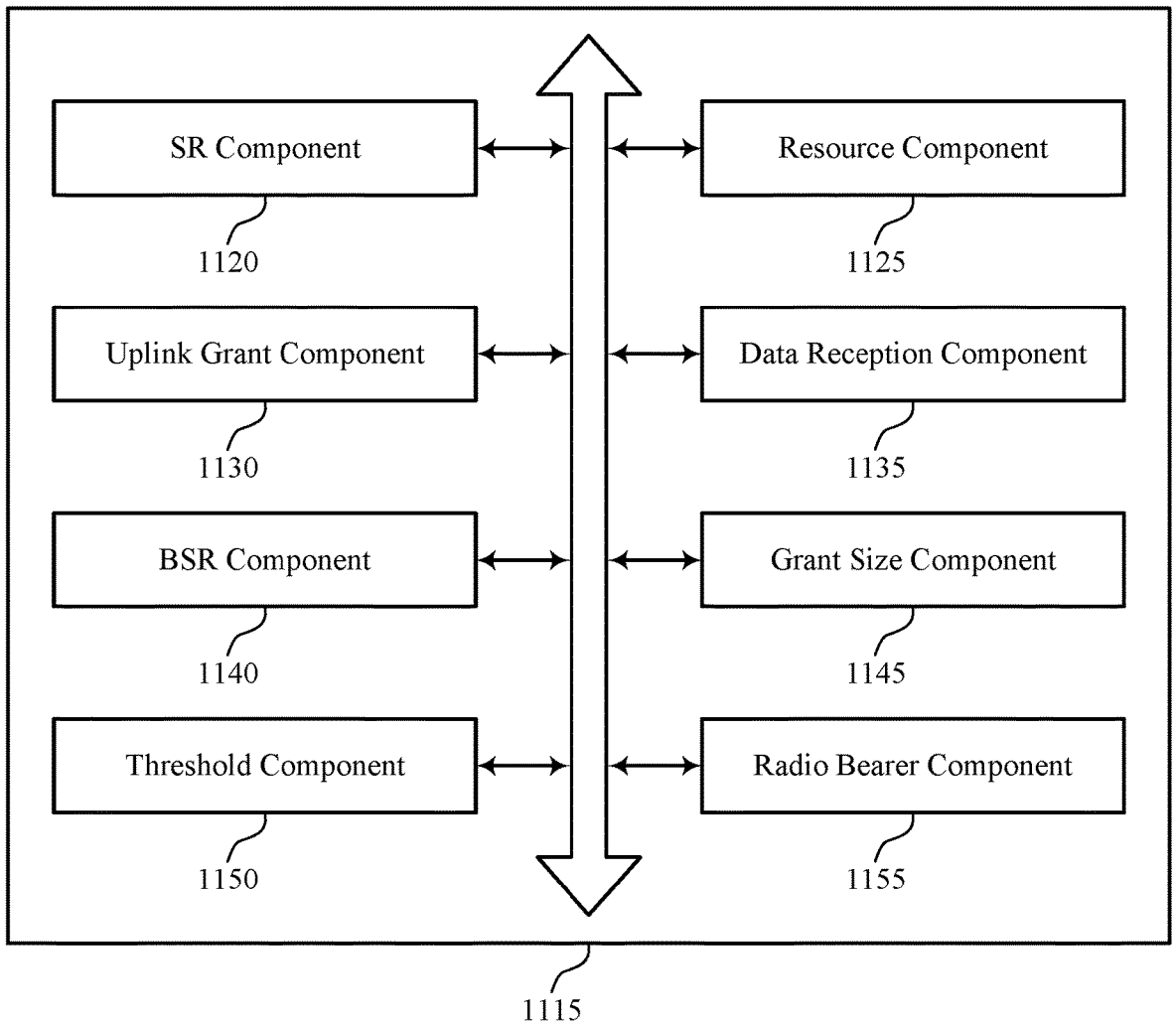

FIG. 11 shows a block diagram 1100 of a base station communications manager 1115 that supports SRs and BSRs for low latency wireless communications in accordance with aspects of the present disclosure. The base station communications manager 1115 may be an example of aspects of a base station communications manager 1215 described with reference to FIGS. 9, 10, and 12. The base station communications manager 1115 may include SR component 1120, resource component 1125, uplink grant component 1130, data reception component 1135, BSR component 1140, grant size component 1145, threshold component 1150, and radio bearer component 1155. Each of these modules may communicate, directly or indirectly, with one another (e.g., via one or more buses).

SR component 1120 may receive, from a UE, a scheduling request for a grant of resources associated with a first data type, where the resources associated with the first data type and resources associated with a second data type have TTIs of different durations. In some aspects, receiving the scheduling request includes receiving the scheduling request via a TTI associated with a control channel of the second data type. In some aspects, the scheduling request indicates a sTTI associated with the first data type. In some aspects, the control channel may be a PUCCH. In some aspects, receiving the scheduling request includes receiving the scheduling request via a control channel over a sTTI. In some aspects, the control channel may be a sPUCCH. In some aspects, the first data type may be associated with low latency communications.

Resource component 1125 may determine, in response to the scheduling request, a set of resources associated with the first data type. In some aspects, the determined set of resources includes sPUSCH resources.

Uplink grant component 1130 may transmit, to the UE, an uplink grant that indicates the determined set of resources.

Data reception component 1135 may receive, from the UE, data of the first data type via the determined set of resources.

BSR component 1140 may receive, via the determined set of resources, a buffer status report for additional data of the first data type or the second data type.

Grant size component 1145 may determine an uplink grant size based on a buffer threshold that is known to both the UE and base station, where the uplink grant indicates the uplink grant size. In some aspects, the uplink grant size indicates number of bits contained in the uplink grant.

Threshold component 1150 may transmit, to the UE, an indication of a buffer threshold, where the scheduling request is based on the buffer threshold.

Radio bearer component 1155 may transmit, to the UE, a radio bearer configuration indicating at least one radio bearer configured for communications of the first data type, the second data type, or both.

Figure 12:
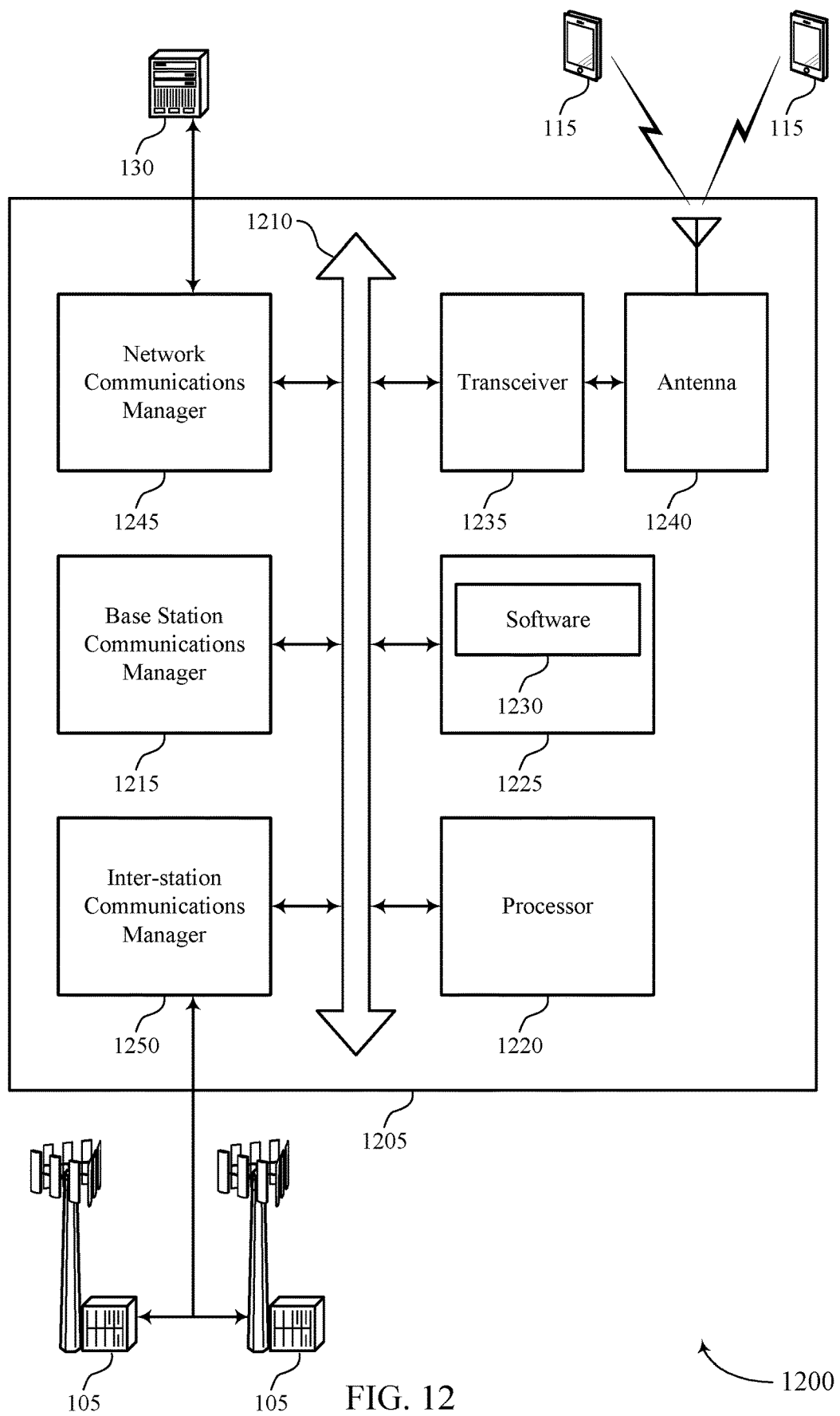
FIG. 12 illustrates a block diagram of a system including a base station that supports scheduling requests and buffer status reports for low latency wireless communications in accordance with aspects of the present disclosure.

FIG. 12 shows a diagram of a system 1200 including a device 1205 that supports SRs and BSRs for low latency wireless communications in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1220 may be configured to operate a memory array using a memory controller. In other aspects, a memory controller may be integrated into processor 1220. Processor 1220 may be configured to execute computer-readable instructions stored in a memory to perform various functions (e.g., functions or tasks supporting SRs and BSRs for low latency wireless communications).

Memory 1225 may include RAM and ROM. The memory 1225 may store computer-readable, computer-executable software 1230 including instructions that, when executed, cause the processor to perform various functions described herein. In some aspects, the memory 1225 may contain, among other things, a BIOS which may control basic hardware and/or software operation such as the interaction with peripheral components or devices.

Software 1230 may include code to implement aspects of the present disclosure, including code to support SRs and BSRs for low latency wireless communications. Software 1230 may be stored in a non-transitory computer-readable medium such as system memory or other memory. In some aspects, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some aspects, the wireless device may include a single antenna 1240. However, in some aspects the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
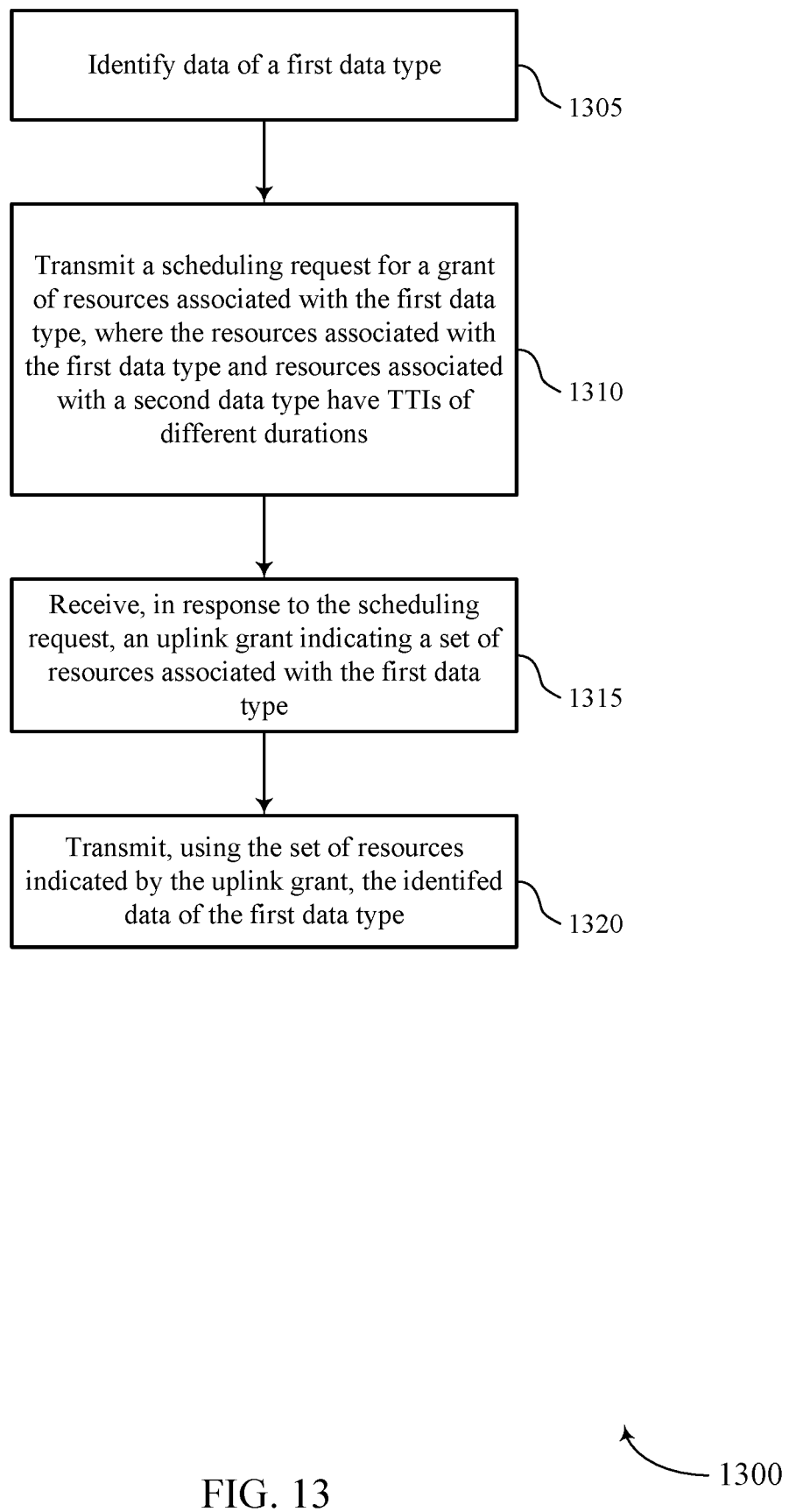
FIGS. 13 through 15 illustrate methods for scheduling requests and buffer status reports for low latency wireless communications in accordance with aspects of the present disclosure.

FIG. 13 shows a flowchart illustrating a method 1300 for SRs and BSRs for low latency wireless communications in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify data of a first data type. The operations of block 1305 may be performed according to the methods described with reference to FIGS. 1 through 4. In certain examples, aspects of the operations of block 1305 may be performed by a data identifier as described with reference to FIGS. 5 through 8.

At block 1310 the UE 115 may transmit a scheduling request for a grant of resources associated with the first data type, wherein the resources associated with the first data type and resources associated with a second data type have TTIs of different durations. The operations of block 1310 may be performed according to the methods described with reference to FIGS. 1 through 4. In certain examples, aspects of the operations of block 1310 may be performed by a SR component as described with reference to FIGS. 5 through 8.

At block 1315 the UE 115 may receive, in response to the scheduling request, an uplink grant indicating a set of resources associated with the first data type. The operations of block 1315 may be performed according to the methods described with reference to FIGS. 1 through 4. In certain examples, aspects of the operations of block 1315 may be performed by a grant component as described with reference to FIGS. 5 through 8.

At block 1320 the UE 115 may transmit, using the set of resources indicated by the uplink grant, the identified data of the first data type, or the BSR, or both. The operations of block 1320 may be performed according to the methods described with reference to FIGS. 1 through 4. In certain examples, aspects of the operations of block 1320 may be performed by a data transmission component as described with reference to FIGS. 5 through 8.

Figure 14:
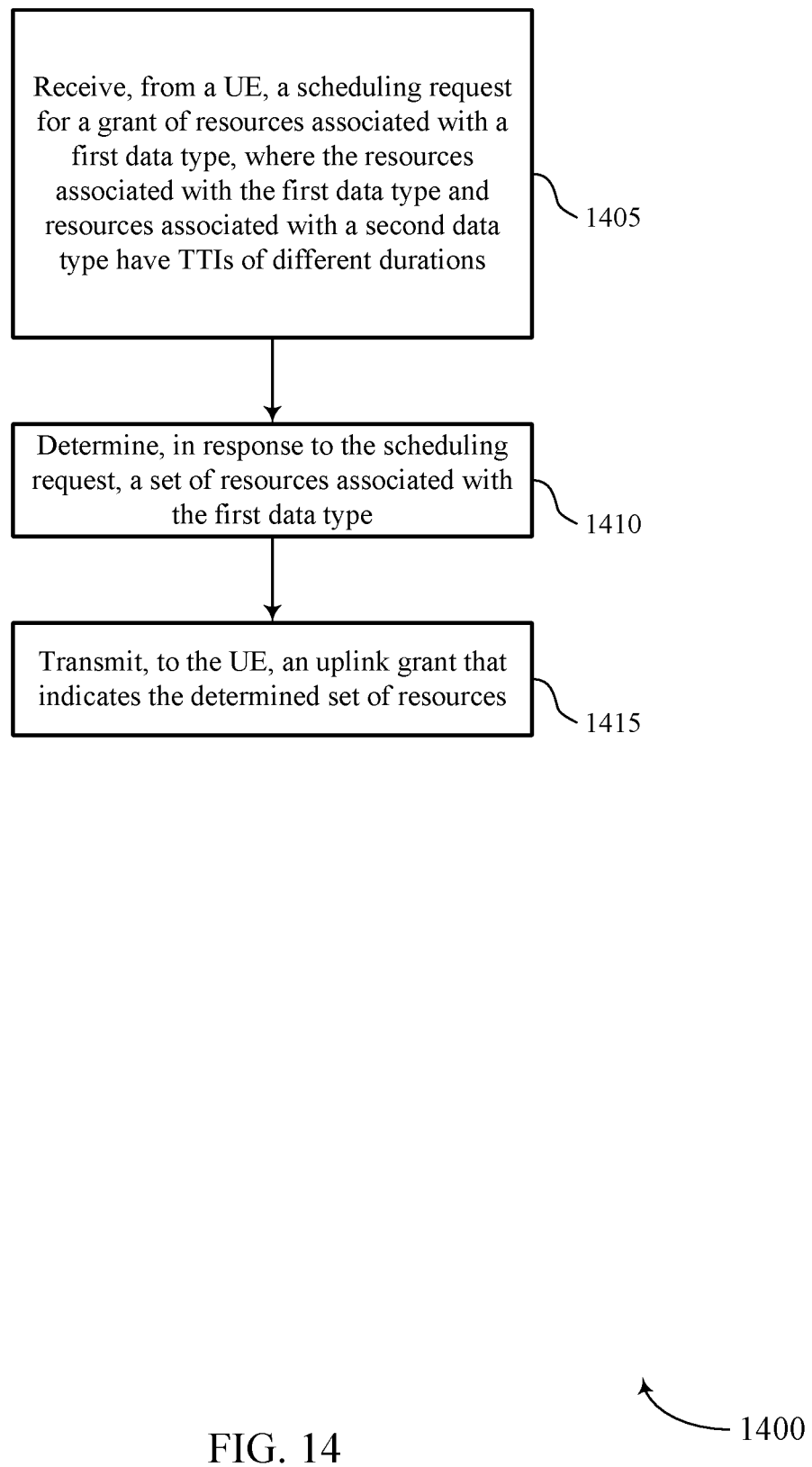

FIG. 14 shows a flowchart illustrating a method 1400 for SRs and BSRs for low latency wireless communications in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may receive, from a UE, a scheduling request for a grant of resources associated with a first data type, wherein the resources associated with the first data type and resources associated with a second data type have TTIs of different durations. The operations of block 1405 may be performed according to the methods described with reference to FIGS. 1 through 4. In certain examples, aspects of the operations of block 1405 may be performed by a SR component as described with reference to FIGS. 9 through 12.

At block 1410 the base station 105 may determine, in response to the scheduling request, a set of resources associated with the first data type. The operations of block 1410 may be performed according to the methods described with reference to FIGS. 1 through 4. In certain examples, aspects of the operations of block 1410 may be performed by a resource component as described with reference to FIGS. 9 through 12.

At block 1415 the base station 105 may transmit, to the UE, an uplink grant that indicates the determined set of resources. The uplink grant may indicate an uplink grant size (e.g., the uplink grant size may indicate a number of bits contained in the uplink grant). In some cases, the uplink grant size may be determined based on a buffer threshold that is known to both the UE and base station. The operations of block 1415 may be performed according to the methods described with reference to FIGS. 1 through 4. In certain examples, aspects of the operations of block 1415 may be performed by a uplink grant component as described with reference to FIGS. 9 through 12.

Figure 15:
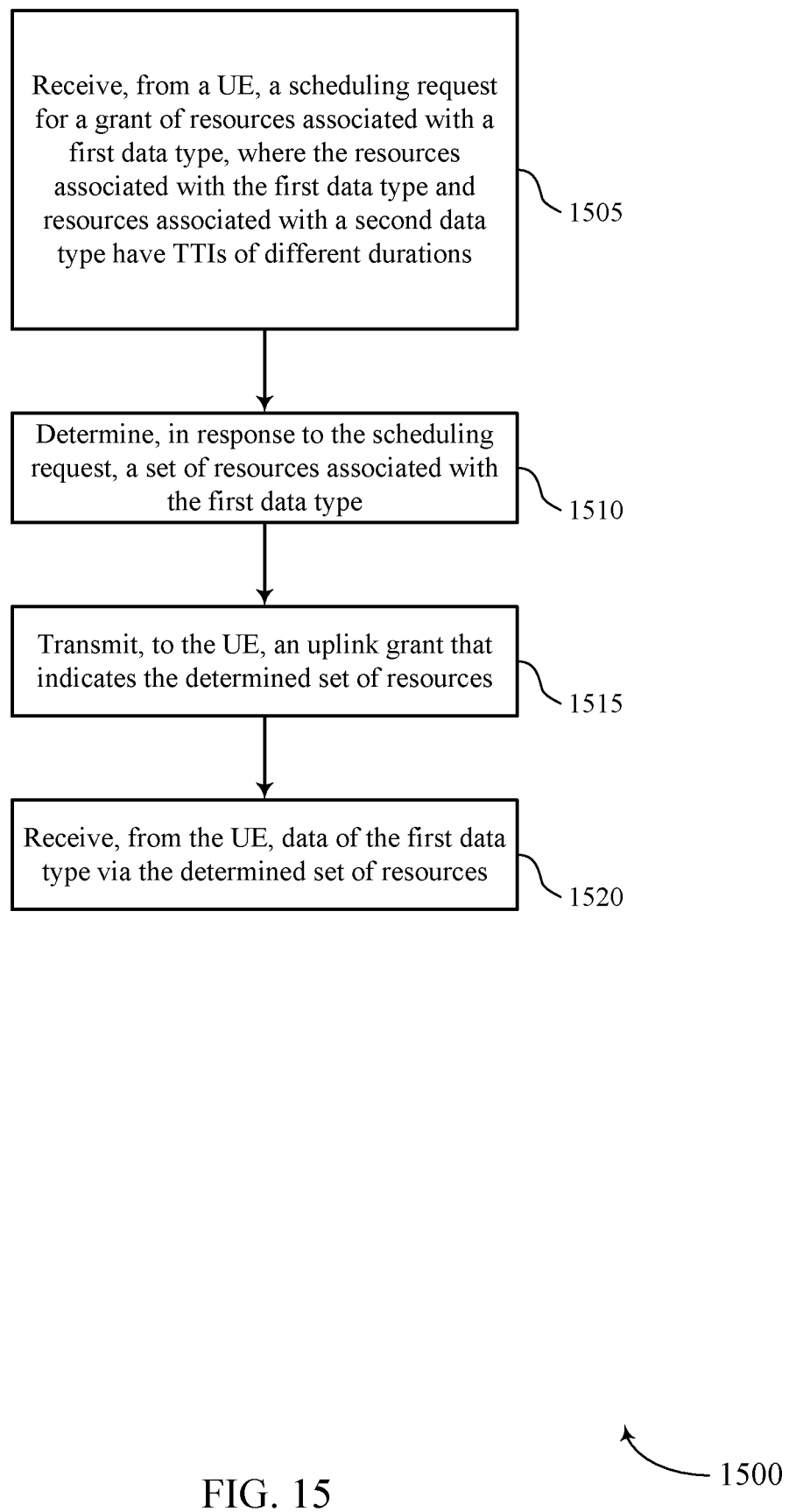

FIG. 15 shows a flowchart illustrating a method 1500 for SRs and BSRs for low latency wireless communications in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive, from a UE, a scheduling request for a grant of resources associated with a first data type, wherein the resources associated with the first data type and resources associated with a second data type have TTIs of different durations. The operations of block 1505 may be performed according to the methods described with reference to FIGS. 1 through 4. In certain examples, aspects of the operations of block 1505 may be performed by a SR component as described with reference to FIGS. 9 through 12.

At block 1510 the base station 105 may determine, in response to the scheduling request, a set of resources associated with the first data type. The operations of block 1510 may be performed according to the methods described with reference to FIGS. 1 through 4. In certain examples, aspects of the operations of block 1510 may be performed by a resource component as described with reference to FIGS. 9 through 12.

At block 1515 the base station 105 may transmit, to the UE, an uplink grant that indicates the determined set of resources. The uplink grant may indicate an uplink grant size (e.g., the uplink grant size may indicate a number of bits contained in the uplink grant). In some cases, the uplink grant size may be determined based on a buffer threshold that is known to both the UE and base station. The operations of block 1515 may be performed according to the methods described with reference to FIGS. 1 through 4. In certain examples, aspects of the operations of block 1515 may be performed by a uplink grant component as described with reference to FIGS. 9 through 12.

At block 1520 the base station 105 may receive, from the UE, data of the first data type via the determined set of resources. The operations of block 1520 may be performed according to the methods described with reference to FIGS. 1 through 4. In certain examples, aspects of the operations of block 1520 may be performed by a data reception component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting a scheduling request for a grant of resources, the scheduling request being associated with data of a first data type;
   receiving an uplink grant indicating a set of resources;
   prioritizing the data of the first data type, additional data of the first data type or a second data type, and a buffer status report (BSR);
   transmitting, using the set of resources indicated by the uplink grant, the data of the first data type based on the prioritizing.

2. The method of claim 1, further comprising:
   determining a data size corresponding to the data of the first data type, wherein the scheduling request is based at least in part on a comparison between the determined data size and a buffer threshold.

3. The method of claim 2, further comprising:
   receiving, from a base station, an indication of the buffer threshold configured by the base station.

4. The method of claim 1, further comprising:
   determining a data size corresponding to the data of the first data type, wherein transmitting the data of the first data type is based at least in part on a comparison between the determined data size and an uplink grant size.

5. The method of claim 1, the data of the first data type comprising pending data of the first data type, the scheduling request being transmitted responsive to the pending data of the first data type.

6. An apparatus for wireless communications at a user equipment (UE), comprising:
   means for transmitting a scheduling request for a grant of resources, the scheduling request being associated with a first data type;
   means for receiving, in response to the scheduling request, an uplink grant indicating a set of resources;
   means for prioritizing data of the first data type, additional data of the first data type or a second data type, and a buffer status report (BSR);
   means for transmitting, using the set of resources indicated by the uplink grant, the data of the first data type based on the prioritizing.

7. The apparatus of claim 6, the data of the first data type comprising pending data of the first data type, the scheduling request being transmitted responsive to the pending data of the first data type.

8. An apparatus for wireless communications at a user equipment (UE), comprising:
   a processor;
   memory in electronic communication with the processor; and
   the processor and the memory are configured to:
      transmit a scheduling request for a grant of resources, the scheduling request being associated with data of a first data type;
      receive an uplink grant indicating a set of resources;
      prioritize the data of the first data type, additional data of the first data type or a second data type, and a buffer status report (BSR);
      transmit, using the set of resources indicated by the uplink grant, the data of the first data type based on the prioritization.

9. The apparatus of claim 8, the processor and the memory being further configured to
   determine a data size corresponding to the identified data of the first data type, wherein the scheduling request is based at least in part on a comparison between the determined data size and a buffer threshold.

10. The apparatus of claim 9, the processor and the memory being further configured to receive, from a base station, an indication of the buffer threshold configured by the base station.

11. The apparatus of claim 8, the processor and the memory being further configured to determine a data size corresponding to the data of the first data type, wherein transmitting the data of the first data type is based at least in part on a comparison between the determined data size and an uplink grant size.

12. The apparatus of claim 8, the processor and the memory being further configured to receive, from a base station, a radio bearer configuration indicating at least one radio bearer configured for communications of the first data type, the second data type, or both.

13. The apparatus of claim 8, wherein the apparatus comprises a receiver configured to receive the uplink grant.

14. The apparatus of claim 8, wherein the apparatus comprises a transmitter configured to transmit the scheduling request and transmit the data of the first data type, or the BSR, or both.

15. The apparatus of claim 8, the data of the first data type comprising pending data of the first data type, the scheduling request being transmitted responsive to the pending data of the first data type.

16. A non-transitory computer readable medium storing code for wireless communications at a user equipment (UE), the code comprising instructions executable by a processor to:

transmit a scheduling request for a grant of resources, the scheduling request being associated with data of a first data type;

receive an uplink grant indicating a set of resources;

prioritize the data of the first data type, additional data of the first data type or a second data type, and a buffer status report (BSR);

transmit, using the set of resources indicated by the uplink grant, the data of the first data type based on the prioritization.

17. The non-transitory computer readable medium of claim 16, the data of the first data type comprising pending data of the first data type, the scheduling request being transmitted responsive to the pending data of the first data type.

* * * * *